(12) United States Patent
Sabe et al.

(10) Patent No.: US 7,146,250 B2
(45) Date of Patent: *Dec. 5, 2006

(54) ROBOT APPARATUS

(75) Inventors: Kotaro Sabe, Tokyo (JP); Masahiro Fujita, Saitama (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/099,038

(22) Filed: Apr. 5, 2005

(65) Prior Publication Data
US 2005/0187660 A1 Aug. 25, 2005

Related U.S. Application Data

(63) Continuation of application No. 09/530,143, filed on Apr. 25, 2000, now Pat. No. 6,934,604.

(30) Foreign Application Priority Data
Sep. 10, 1998 (JP) .............................. P10-256465

(51) Int. Cl.
G05F 19/00 (2006.01)

(52) U.S. Cl. ............... 700/245; 700/248; 700/258; 700/259; 700/253; 901/1; 901/15; 901/49; 218/568.1; 218/568.11; 218/568.12; 218/568.2; 218/565; 218/569; 348/121; 704/207; 704/209

(58) Field of Classification Search ................ 700/245, 700/248, 258, 259, 31; 901/1, 15, 49; 704/207, 704/209, 270; 348/121; 318/565, 569, 568.1, 318/568.11, 568.12, 568.2
See application file for complete search history.

(56) References Cited

U.S. PATENT DOCUMENTS

| 5,802,494 A * | 9/1998 | Kuno ............................. 705/2 |
| 5,825,981 A * | 10/1998 | Matsuda ....................... 700/248 |
| 6,021,369 A * | 2/2000 | Kamihira et al. ............ 701/102 |
| 6,032,139 A * | 2/2000 | Yamaguchi et al. .......... 706/13 |
| 6,438,457 B1 * | 8/2002 | Yokoo et al. ................ 700/245 |
| 2005/0197740 A1 * | 9/2005 | Sabe et al. ................... 700/245 |
| 2005/0240412 A1 * | 10/2005 | Fujita .......................... 704/270 |

OTHER PUBLICATIONS

Takanishi et al., Dynamic quadruped walking stabilized with trunk motion, 1995, IEEE, p. 165-172.*

(Continued)

Primary Examiner—Thomas Black
Assistant Examiner—McDieunel Marc
(74) Attorney, Agent, or Firm—Bell, Boyd & Lloyd LLC

(57) ABSTRACT

A robot apparatus is provided. A CPU 15 determines an output of a feeling model based on signals supplied from a touch sensor 20. The CPU 15 also deciphers whether or not an output value of the feeling model exceeds a pre-set threshold value. If the CPU finds that the output value exceeds the pre-set threshold value, it verifies whether or not there is any vacant area in a memory card 13. If the CPU finds that there is any vacant area in a memory card 13, it causes the picture data captured from the CCD video camera 11 to be stored in the vacant area in the memory card 13. At this time, the CPU 15 causes the time and date data and the feeling parameter in the memory card 13 in association with the picture data. The CPU 15 also re-arrays the picture data stored in the memory card 13 in the sequence of the decreasing magnitude of the feeling model output.

9 Claims, 24 Drawing Sheets

OTHER PUBLICATIONS

Kang et al., A study on an adaptive gait for a quadruped walking robot under external forces, 1997, IEEE, p. 2777-2782.*

Arikawa et al., Development of quadruped walking robot TITAN-VIII, 1996, IEEE, p. 208-214.*

Tsukagoshi., Maneuvering operations of the quadruped walking robot on the slope, 1996, IEEE, p. 863-869.*

Stephenson, Dr. robot tested at Hokins, 2003, Internet, p. 1.*

* cited by examiner

PET TYPE ROBOT 1

ROBOT APPARATUS

CROSS REFERENCE TO RELATED APPLICATIONS

The present application is a continuation of U.S. patent application Ser. No. 09/530,143 filed on Jun. 9, 2000 and subsequently issued as U.S. Pat. No. 6,934,604, which claims priority to International Patent Application No. PCT/JP99/04957, filed on Sep. 10, 1999, and Japanese Patent Application No. P10-256465, filed on Sep. 10, 1998, the disclosure of which are herein incorporated by reference.

BACKGROUND OF THE INVENTION

The present invention relates to a robot apparatus having a feeling or behavior model changed by extraneous or innate factors, a control method for a robot apparatus, a furnishing medium, a display method for data written in storage means, and a furnishing medium.

As an automatic mobile robot aimed at collecting marine data, an underwater search robot, for example, has been developed. For an underwater search robot, it is desirable to collect and record as many data difficult to collect as possible. These data include, as an example, seawater temperature data, sea stream data, depth data, terrestrial data and picture data. The operations of extracting and analysing effective data is usually carried out after the underwater search robot has returned to the water surface.

Recently, an automatic mobile robot, aimed at entertainment, has been furnished. It is presumed that the entertainment performance of the automatic mobile robot will become higher by accumulating data responsive to conditions changing with lapse of time.

However, in the automatic mobile robot, aimed at entertainment, protracted storage of meaningless data in the robot leads to increased memory costs.

On the other hand, the operation of extracting effective data from the data stored in a robot is time- and labor-consuming.

Moreover, it may be presumed that, if the data extracted from the automatic mobile robot can be browsed on the assumption that the data has been collected by the automatic mobile robot, or can be recognized as such, the amusement performance of the robot will be higher.

SUMMARY OF THE INVENTION

In an embodiment, the present invention provides a robot apparatus having a feeling model or a behavioral model changed by an extraneous or innate factor that is able to extract only effective data, a control method for the robot apparatus, a furnishing medium, a display method for displaying data written by the robot apparatus on memory means on a display unit, and a furnishing medium.

That is, a robot apparatus according to the present invention has a behavioral model or a feeling model changed at least based on extraneous factors, and includes detection means for detecting extraneous states, storage means for storing data and write control means for writing pre-set data in the storage means based on a detection signal detected by the detection means.

In this robot apparatus, the pre-set data is written by the erasure control means in the storage means based on a detection signal detected by the detection means adapted for detecting the extraneous state.

A method for controlling a robot apparatus according to the present invention has a behavioral model or a feeling model changed at least based on extraneous factors and includes a detecting step of detecting extraneous states by detection means and a write control step of writing pre-set data in the storage means based on a detection signal detected by the detection means.

In this robot apparatus control method, having these steps, pre-set data is written in the storage means based on the detection signal detected by the detection means.

A furnishing medium furnishes a program to a robot apparatus having a behavioral model or a feeling model changed at least based on extraneous factors, the program being configured to execute processing. The program includes a detecting step of detecting extraneous states by detection means, and a write control step of writing pre-set data in the storage means based on a detection signal detected by the detection means.

By this furnishing medium, the robot apparatus writes pre-set data in the storage means based on the detection signal detected by the detection means.

A robot apparatus according to the present invention has a behavioral model for outputting a pre-set behavior command or a feeling model for outputting the feeling information, and includes detection means for detecting extraneous states, storage means for storing data and write control means for writing pre-set data in the storage means based on the pre-set behavior command or the feeling information.

This robot apparatus, having the above structure, writes pre-set data by write control means in storage means based on the pre-set behavior command or the feeling information.

A method for controlling a robot apparatus according to the present invention is adapted to control a robot apparatus having a behavioral model or the feeling information outputting a pre-set behavior command. The method includes a step of outputting the pre-set behavior command or the feeling information based on the behavioral model or the feeling information based on the input information and a write control step of writing pre-set data based on the pre-set behavior command or the feeling information.

In the robot apparatus control method, having the above steps, pre-set data is written in storage means based on the pre-set behavior command or feeling information.

A furnishing medium according to the present invention furnishes a program to a robot apparatus having a behavioral model outputting a pre-set behavior command or the feeling information, the program being adapted to execute processing including a step of outputting the pre-set behavior command or the feeling information based on the behavioral model or the feeling information based on the input information and a write control step of writing pre-set data based on the pre-set behavior command or the feeling information.

By this furnishing medium, the robot apparatus is able to write pre-set data based on the pre-set behavior command or feeling information.

A robot apparatus according to the present invention has an instinct model for outputting the instinct information, and includes detection means for detecting extraneous states, storage means for storing data and write control means for writing pre-set data in the storage means. The write control means writes the pre-set data in the storage means based on the instinct information.

In this robot apparatus, pre-set data is written in the storage means based on the instinct information.

A method for controlling a robot apparatus having an instinct model outputting the instinct information, according to the present invention, includes an outputting step of outputting the instinct information by the instinct model based on the input information, and a write control step of writing pre-set data based on the instinct information.

In this robot apparatus control method, pre-set data is written in the storage means based on the instinct information.

A furnishing medium for furnishing a program to a robot apparatus having an instinct model adapted to output the instinct information, the program being adapted to execute the processing including an outputting step of outputting the instinct information by the instinct model based on the input information and a write control step of writing pre-set data in storage means based on the instinct information.

By this furnishing medium, the robot apparatus writes pre-set data in the storage means based on the instinct information.

A robot apparatus according to the present invention has a behavioral model, a feeling model or an instinct model changed based at least on inner factors, the behavioral model, feeling model or the instinct model outputting a pre-set behavior command, feeling information or the instinct information based on the inner factor. The robot apparatus includes monitoring means for monitoring the inner state as the inner factor, storage means for memorizing data and write control means for writing the pre-set data in the storage means. The write control means writes the pre-set data in the storage means based on the monitored results by the monitoring means.

In this robot apparatus, pre-set data is written in storage means based on the inner state.

A method for controlling a robot apparatus having a behavioral model, a feeling model or an instinct model changed based at least on inner factors, the behavioral model, feeling model or the instinct model outputting a pre-set behavior command, feeling information or the instinct information based on the inner factor, according to the present invention, includes a write control step of monitoring the inner state as the inner factor and writing the pre-set data in storage means based on the monitored results.

In this robot apparatus control method, having these steps, pre-set data is written in storage means based on the inner state.

A furnishing medium according to the present invention furnishes a program to a robot apparatus having a behavioral model, a feeling model or an instinct model changed based at least on inner factors, the behavioral model, feeling model or the instinct model outputting a pre-set behavior command, feeling information or the instinct information based on the inner factor, the program causing execution of the processing including a write control step of monitoring the inner state as the inner factor to write pre-set data in storage means based on the monitored results.

By this furnishing medium, the robot apparatus writes pre-set data in the storage means based on the inner state.

A display method according to the present invention includes a read-out step of reading out the pre-set data memorized in the storage means by a robot apparatus having a behavioral model, a feeling model and/or an instinct model changed based at least on extraneous factors and/or inner factors, the robot apparatus writing pre-set data in storage means depending co conditions, and a display step of displaying the pre-set data read out by the read-out step on a display.

In this display method, having the above steps, the robot apparatus displays pre-set data stored by the robot apparatus in the storage means.

A furnishing medium according to the present invention furnishes a program to a picture display apparatus adapted to demonstrate a picture on a display. The program is adapted to execute the processing including a read-out step of reading out pre-set data stored in the storage means by a robot apparatus having a behavioral model and/or a feeling model and/or an instinct model changed depending on an extraneous factor or an inner factor, the robot apparatus writing pre-set data depending on conditions and a displaying step of displaying in the display the pre-set data read out by the read-out step.

By the furnishing medium, the picture display apparatus demonstrates pre-set data stored by the robot apparatus in the storage means on the display.

Additional features and advantages of the present invention are described in, and will be apparent from, the following Detailed Description of the Invention and the figures.

DETAILED DESCRIPTION OF THE INVENTION

Figure 1:
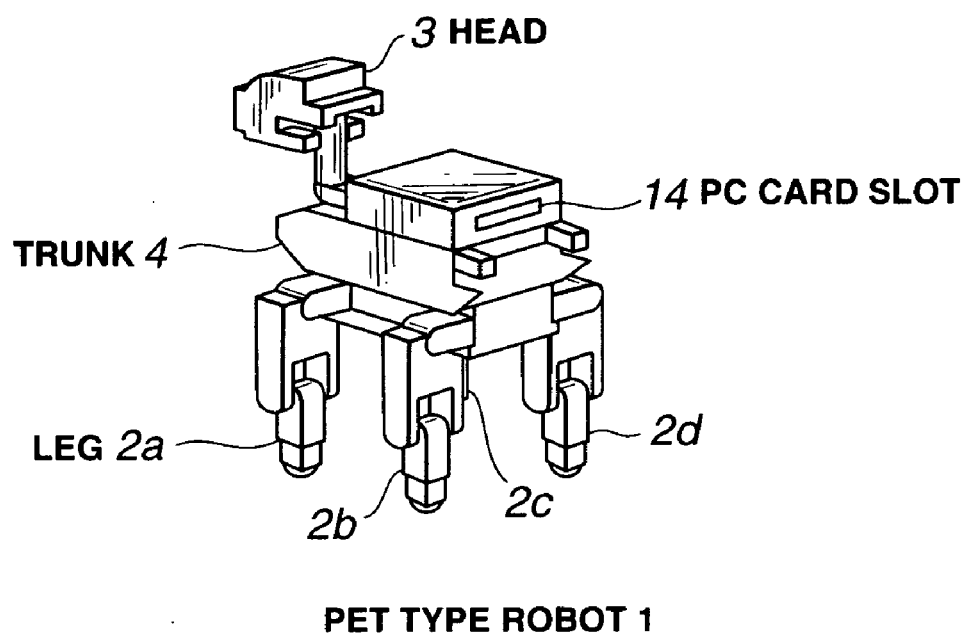
FIG. 1 is a perspective view of a pet type robot embodying the present invention.

Referring to the drawings, a best mode for carrying out the invention will be explained in detail.

The illustrated embodiment of the present invention is the application of the invention to a pet type robot. The pet type robot embodying the present invention is configured as shown for example in FIG. 1.

This pet type robot 1 is made up of legs 2a, 2b, 2c and 2d, driven for movement, a head 3, housing a CCD (charge coupled device) video camera 11 (FIG. 2) and a trunk 4. The pet type robot 1 behaves and changes its feeling in accordance with a program determining its own behavior based on extraneous and innate factors. It is noted that the program which determines the own behavior is constructed by a behavioral model or a feeling model. Specifically, the pet type robot 1 is configured to walk autonomously in association with the inputs from variable sensors, such as a touch sensor 20 of FIG. 2 as later explained, based on a program determining its own behavior.

The pet type robot 1 is provided with a PC card slot 14 for loading a memory card 13. This pet type robot 1 is able to write pre-set data on the memory card 13 loaded on the PC card slot 14 depending on conditions. It is noted that the conditions of writing data on the memory card 13 may be based on a behavior command issued by the behavioral model, on the feeling information issued by the feeling model, on the dialog with a user (keeper), on the results of detection with the external states, or on the results of detection of the internal state caused by innate factors.

Figure 2:
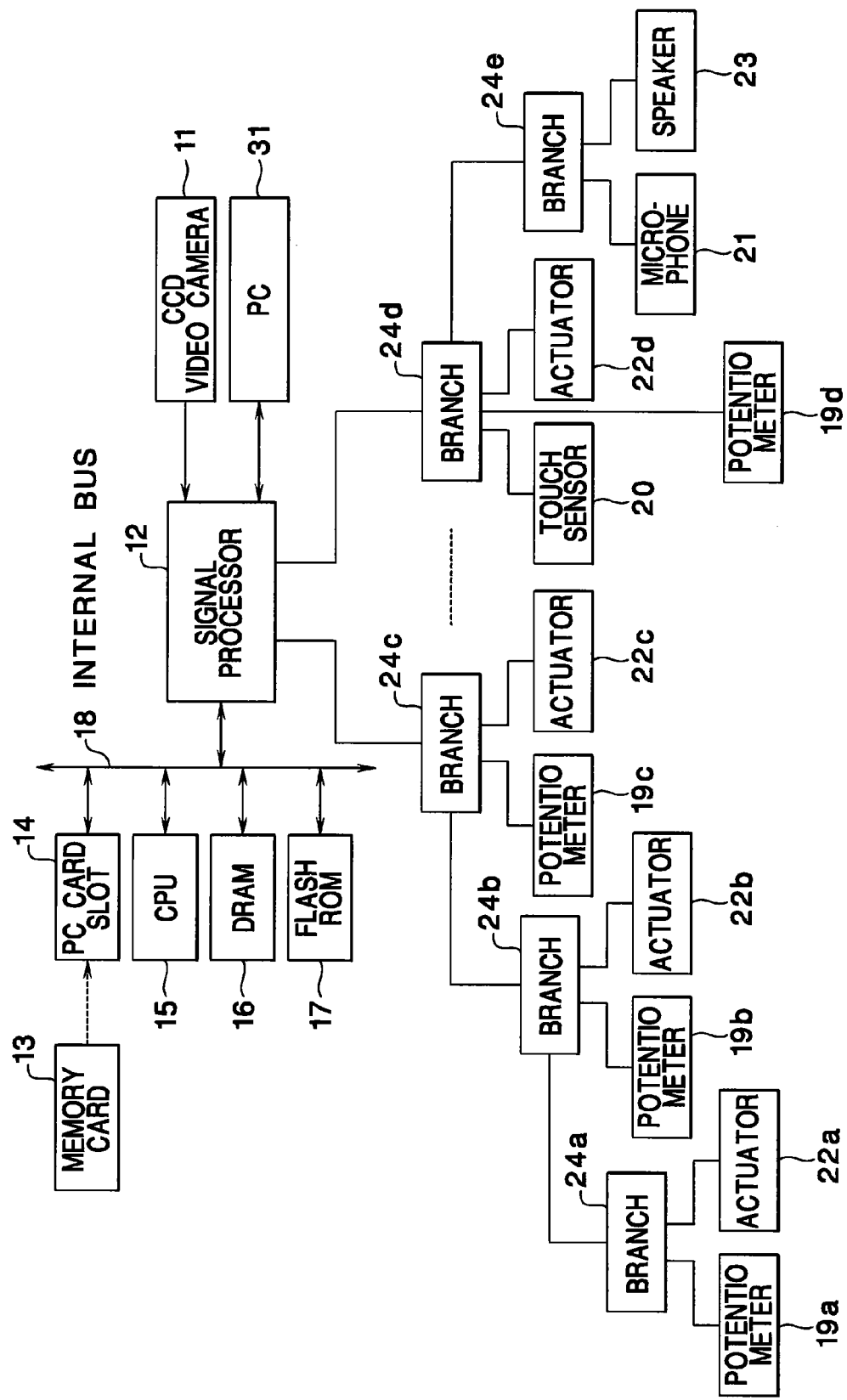
FIG. 2 is a block diagram showing an innate electrical structure of the pet type robot.

The pet type robot 1 is constructed by having its various components electrically connected to one another as shown for example in FIG. 2. The picture data picked up by a CCD video camera 11 is sent to a signal processing unit 12. This signal processing unit 12 processes the picture data routed from the CCD video camera 11 to memorize the picture data over an internal bus 18 in the memory card 13 or a DRAM (dynamic random access memory) 16 as memorizing means.

A CPU (central processing unit) 15 reads out the operating program stored in a flash ROM (read-only memory) 17 over the internal bus 18 to control the entire system. The operating program of the CPU 11, stored in the flash ROM 17, can be formulated or modified by an external personal computer (PC) 31 connected to the signal processing unit 12. This CPU 15 has, as its functions, the writing control function of writing data in the memory card 13 or the DRAM 16 as memory means, an erasure control function of erasing data written in the memory card 13 and in the memory means, and a re-arraying function of re-arraying the data written in the memory means based on the data annexed to the data.

The signals detected by potentiometers 19a to 19d, making up detection means for detecting the external state, a touch sensor 20 and a microphone 21 are routed through branching portions 24a to 24e to the signal processing unit 12, which signal processing unit 12 routes signals sent from the branching portions 24a to 24e over the internal bus 18 to the CPU 15. The CPU 15 controls the operation of the actuators 22a to 22d and the legs 2a to 2d as well as head 3 driven thereby, based on the supplied signals. The CPU 15 controls the speech outputted from the speaker 23.

It is noted that the potentiometers 19a to 19d, touch sensor 20, microphone 21, actuators 22a to 22d and the speaker 23 constitute legs, ears and a mouth of the pet type robot 1 and are collectively termed a CPC (configurable physical component) device.

Figure 3:
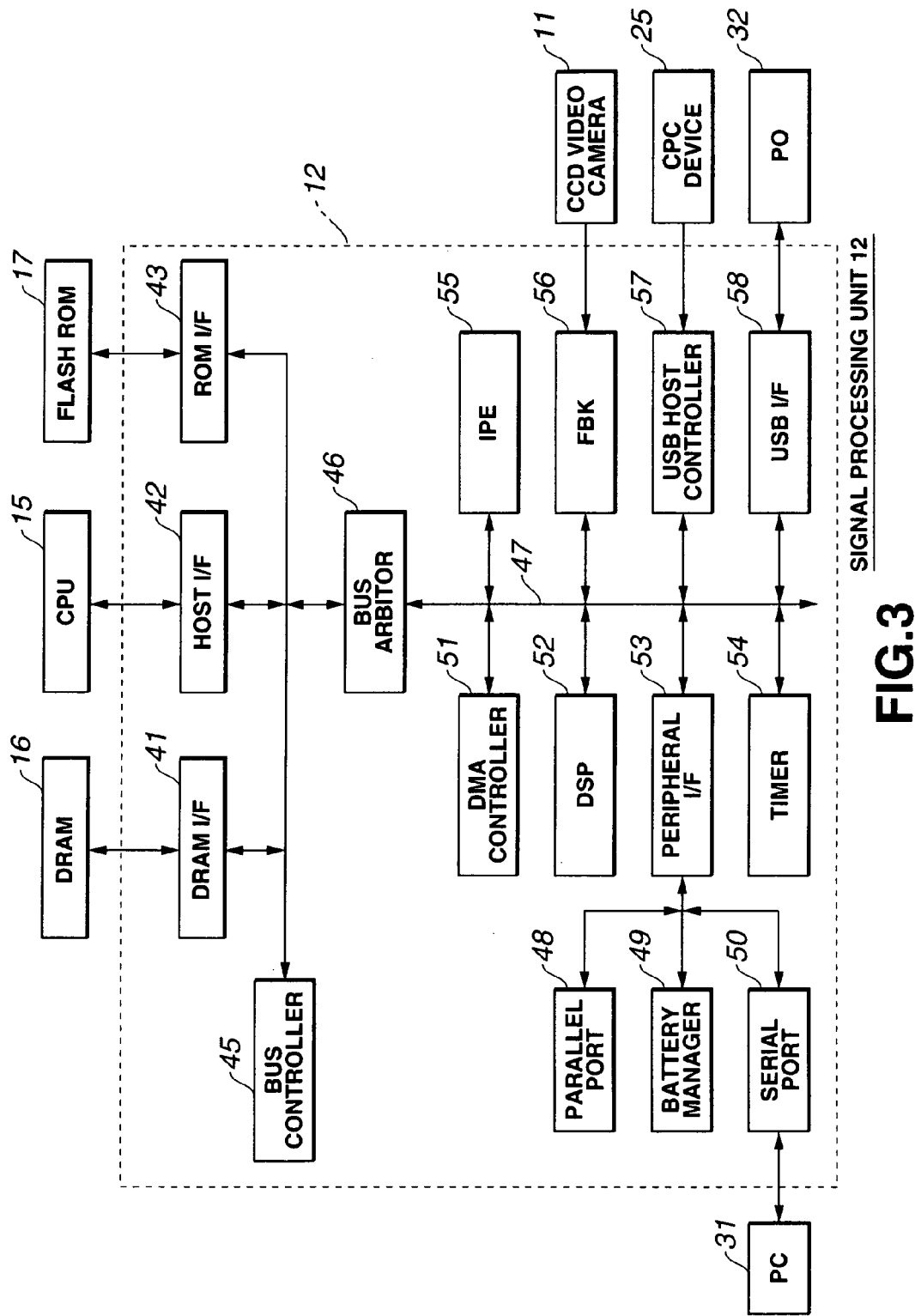
FIG. 3 is a block diagram showing a detailed structure of a signal processing unit of the pet type robot.

FIG. 3 shows an illustrative structure of the signal processing unit 12. A DRAM interface 41, a host interface 42 and a ROM interface 43 are connected to the DRAM 16, CPU 15 and to the flash ROM 17, while being connected to an external bus 44. A bus controller 45 controls the external bus 44, whilst a bus arbiter 46 arbitrates between the external bus 44 and an internal bus 47.

To a parallel port 48 and a serial port 50 is connected a personal computer (P) 31 as an external development environment. A battery manager 49 manages the residual capacity of a battery, not shown. The parallel port 48, battery manager 49 and the serial port 50 are connected over a peripheral interface 53 to the internal bus 47.

The CCD video camera 11 furnishes the pictured picture data to a filter bank FBK 56, which then thins out supplied picture data to formulate picture data of variable resolutions. These picture data are routed over the internal bus 47 to a direct memory access (DMA) controller 51. The DMA controller 51 transfers the furnished picture data to the DRAM 16 for storage therein.

The DMA controller 51 causes the picture data stored in the dram 16 to be read out and routed to an IPE (inner product engine) 55. The IPE 55 executes pre-set calculations using the furnished picture data. The calculated results are transferred to the dram 16 in accordance with commands from the DMA controller 51 for storage therein.

To a USB (universal serial bus) host controller 57 is connected a CPC device 25, which CPC device 25 is made up of, for example, the potentiometers 19a to 19d, touch sensor 20, microphone 21, actuators 22a to 22d and the speaker 23. The speech data furnished from the CPC device 25 are furnished via the USB host controller 57 to a DSP (digital signal processor) 52, which then executes pre-set processing on the furnished speech data. To the USB interface 58 is connected the personal computer (PC) 32 as an eternal developing environment. A timer 54 routes time information to respective components over the internal bus 47.

The above is the structure of the pet type robot 1. The behavioral model or the feeling model of the pet type robot 1 is changed based on the extraneous or innate factors. The pet type robot behaves responsive to an output of the behavioral model or the feeling model.

Figure 4:
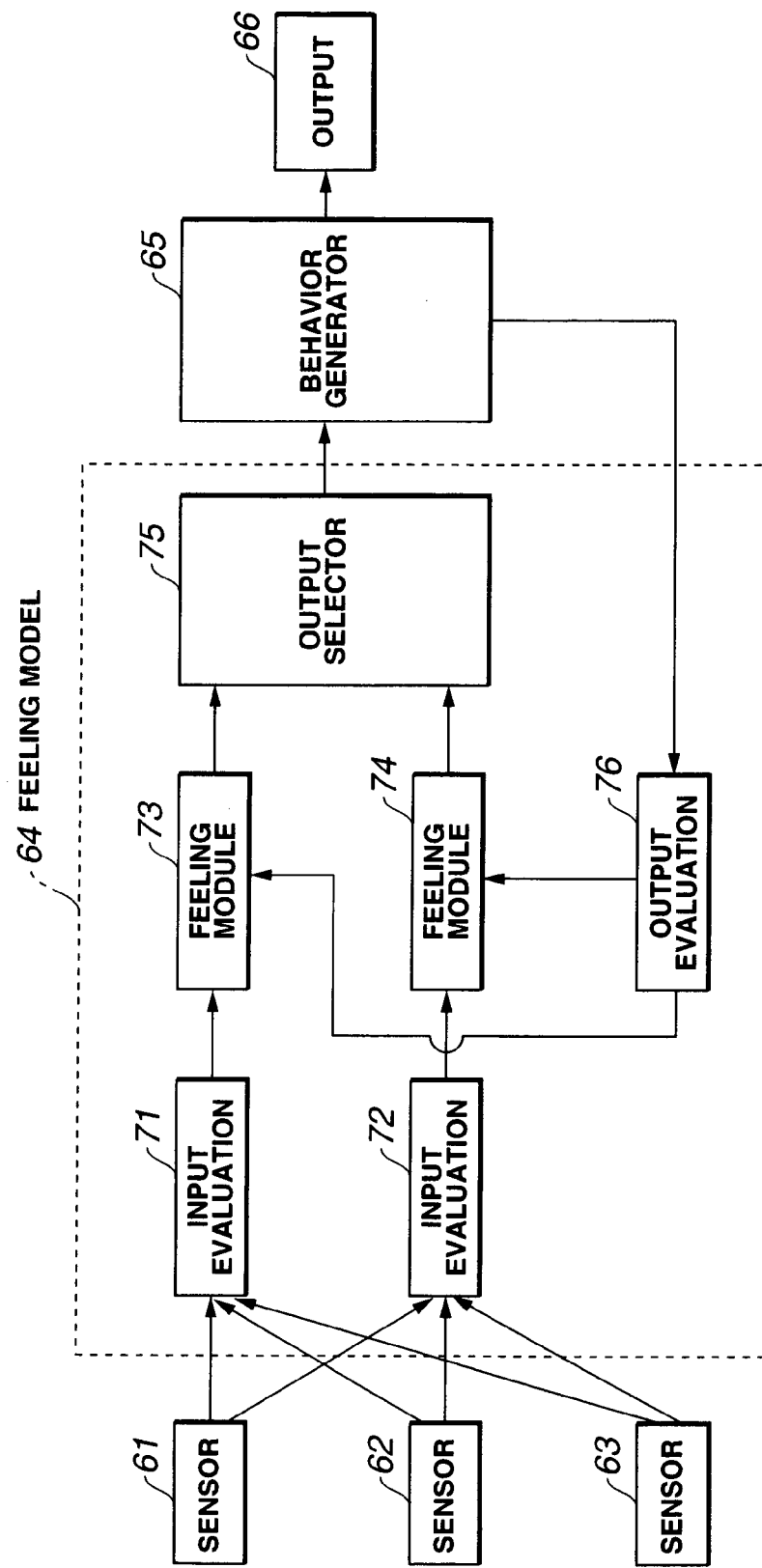
FIG. 4 is a block diagram for illustrating the feeling model of the pet type robot.

A feeling model 64 of the pet type robot 1 is constructed as shown for example in FIG. 4.

The first to third sensors 61 to 63 detect stimuli applied from outside, such as environment, to convert the stimuli into electrical signals, which are outputted. These electrical signals are sent to first and second input evaluation units 71, 72. It is noted that the first to third sensors 61 to 63 are comprised not only of the potentiometers 19a to 19d, touch sensor 20, microphone 21, but of a speech recognition sensor and a picture color recognition sensor etc, and converts the actuations by the user in taking care of the robot 1 or the speech the or she enunciated into electrical signals, which are outputted. Outputs of the first to third sensors 61 to 63 are routed to the first and second input evaluation units 71, 72.

The first input evaluation unit 71 evaluates the electrical signals furnished from the first to third sensors 61 to 63 to detect a pre-set feeling. This pre-set feeling may, for example, be the feeling of pleasure. The first input evaluation unit 71 sends an evaluation value of the detected feeling to a first feeling module 73. To the first feeling module 73 is allocated a pre-set feeling such that the feeling parameter is increased or decreased based on the evaluated feeling value furnished by the first input evaluation unit 71. If, for example, the "pleasure" is allocated to the first feeling module 73, the parameter of the feeling "pleasure" is increased or decreased based on the evaluated value of the feeling supplied from the first input evaluation unit 71. The first feeling module 73 sends the feeling parameter to an output selection unit 75.

Similarly, a second input evaluation unit 72 evaluates the electrical signals furnished from the first to third sensors 61 to 63 to detect the pre-set feeling. The pre-set feeling here is, for example, the feeling of anger. The second input evaluation unit 72 sends the detected evaluation value of the feeling to a second feeling module 74. To the second feeling module 74 is allocated a pre-set feeling such that the feeling parameter is increased or decreased based on the evaluated feeling value furnished by the second input evaluation unit 72. If, for example, the "anger" is allocated to the second feeling module 74, the parameter of the feeling "Anger" is increased or decreased based on the evaluated value of the feeling supplied from the second input evaluation unit 72. The second feeling module 74 sends the feeling parameter to the output selection unit 75.

The output selection unit 75 checks whether or not the feeling parameter supplied from the first and second feeling modules 73, 74 exceeds a pre-set threshold value, and outputs the feeling parameter exceeding the threshold value. If the two feeling parameters from the first and second feeling modules 73, 74 exceed the threshold value, the output selection unit 75 selects a larger one to output the selected parameter.

A behavior generator 65 converts the feeling supplied from the output selection unit 75 into a command instructing a specified behavior to route the command to an output unit 66 while feeding the command back to an output evaluation unit 76.

The output evaluation unit 76 evaluates the behavior supplied from the behavior generator 65 and, if the behavior is performed, the output evaluation unit 76 performs control to decrease the feeling parameter corresponding to the behavior.

An output unit 66 makes an output consistent with a behavior command from the behavior generator 65. The output unit 66 issues an output of the pet type robot 1 which then behaves in accordance with a behavior command from the behavior generator 65. That is, the output unit 66 is made up of the actuators 22a to 22d and the speaker 23 driving the components such as legs 2a to 2d, head 3 or the trunk 4, and drives pre-set actuators to turn the head 3 or issue a whining or meowing sound.

The pet type robot 1 performs the behavior in this manner based on the feeling parameter of the feeling model. In addition, the pet type robot 1 is able to write pre-set data in storage means in the storage means based on feeling parameters. When the pet type robot 1 has done such behavior expressing the feeling, it writes the surrounding picture and sound as external states in the storage means. It is noted that the picture is captured by the CCD video camera 11 as external inputting means forming a part of detection means detecting the external state, whilst the sound is captured by the microphone 21 as external inputting means.

The picture is captured by a CCD video camera 11 as external inputting means, constituting a portion of detection means adapted for detecting the extraneous state, whilst the speech is captured by a microphone as external inputting means.

In the following exclamation, it is assumed that the "pleasure" and "anger" are allocated to the first and second feeling modules 73, 74, respectively. It is also assumed that the first sensor 61, second sensor 62 and the third sensor 63 are a picture color recognizing sensor, a sound recognizing sensor and a touch recognizing sensor 20, respectively.

When fed from the picture color recognizing sensor (first sensor) 61, sound recognizing sensor (second sensor) 62 and from the touch recognizing sensor (third sensor 20) with electrical signals associated with the "yellow", electrical signals corresponding to a pre-set frequency, such as "re" and with electrical signals corresponding to the "caressing" state, respectively, the first input evaluation unit 71 evaluates the respective signals to determine the evaluation value for "pleasure". The first input evaluation unit 71 routes the evaluation value "pleasure" to the first feeling module 73. The first feeling module 73 increases the feeling parameter based on the evaluation value for "pleasure". The feeling parameter is routed to the output selection unit 75.

When fed from the picture color recognizing sensor (first sensor) 61, sound recognizing sensor (second sensor) 62 and from the touch recognizing sensor (third sensor 20) with electrical signals associated with the "red", electrical signals corresponding to a pre-set frequency, such as "fa" and with electrical signals corresponding to the "hitting" state, respectively, the second input evaluation unit 72 evaluates the respective signals to determine the evaluation value for "anger". The second input evaluation unit 72 routes the evaluation value "anger" to the second feeling module 74. The second feeling module 74 increases the feeling parameter based on the evaluation value for "anger". The feeling parameter is routed to the output selection unit 75.

The output selection unit 75 checks whether or not the feeling parameter supplied from the first or second feeling modules 73, 74 exceeds a pre-set threshold value. It is assumed here that the feeling "anger" exceeds a threshold value.

The behavior generator 65 converts the feeling parameter supplied from the output selection unit 75 into a command instructing a specified behavior (barking) to route the command to the output unit 66, while causing the command to be fed back to the output evaluation unit 76.

The output unit 66 issues an output in accordance with a behavior command (barking) from the behavior generator 65. That is, the output unit 66 outputs the corresponding sound. The "anger" is released by the pet type robot 1 barking so that its feeling of "anger" is suppressed. In this consideration, the output evaluation unit 76 decreases the feeling parameter of the second feeling module 74.

Meanwhile, the above-mentioned output of the feeling model 64 is the feeling parameter differentiated with respect to time. That is, the larger the variation in the feeling parameter, the larger becomes an output of the feeling model 64. For example, if the feeling parameter "anger" of the pet type robot 1 is of a larger magnitude, the feeling parameter "pleasure" is rapidly changed (increased) by the robot viewing the yellow ball it likes. In this case, the picture data captured from the CCD video camera 11 is verified by the pet type robot 1 as being valid picture data so that it is stored in memory means such as memory card 13.

The above is the explanation of the feeling model for the pet type robot 1. The behavioral model for determining the behavior of the pet type robot 1 based on the various information is hereinafter explained with reference to FIG. 5.

Figure 5:
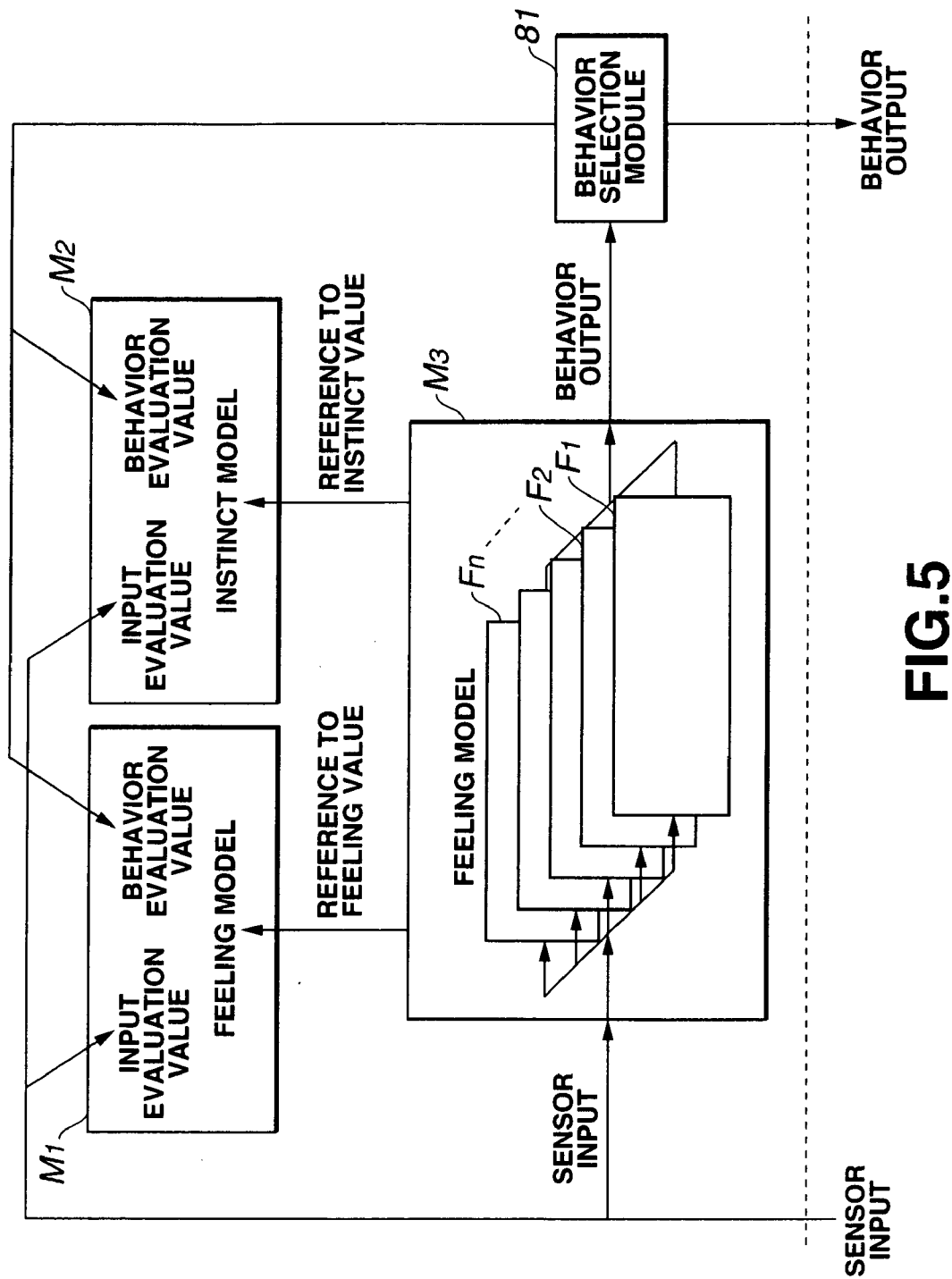
FIG. 5 illustrates the relationship between the sensor input, feeling model, instinct model and the behavioral model in the pet type robot.
Figure 6:
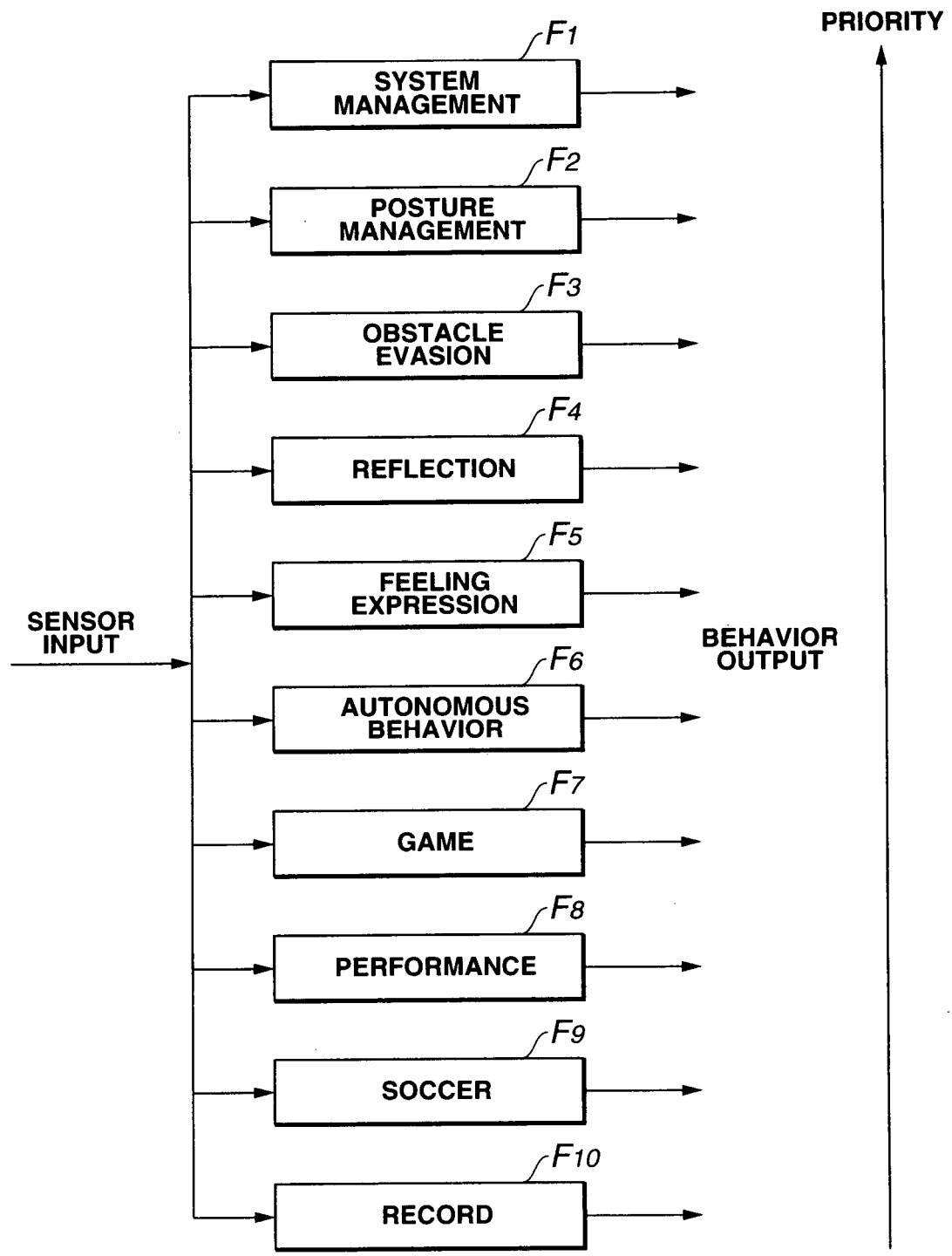
FIG. 6 shows a table for plural status transitions for determining a behavioral output as a subsystem for the behavioral model.

The behavioral model determines the behavioral output for causing the operation of the pet type robot 1 by a sensor input, as shown in FIG. 5. The sensor input is an input from the sensor for acquiring the external information such as the potentiometers 19a to 19c of the CPC device 25. This behavioral model M3 has a table of plural transition states having different objectives for behavior as a subsystem. Specifically, referring to FIG. 6, the subsystem includes a system management F1 having system management as the objective for behavior, a posture management F2, having the posture management as the objective for behavior, and an obstruction evasion F3, having the obstruction evasion as the objective for behavior. The behavioral model M3 also includes a reflection F4, having the reflective movement as the objective for behavior, a feeling expression F5 having the feeling expression as the objective for behavior, and an autonomous behavior F6 in general, having the autonomous behavior in general as the objective for behavior. The behavioral model M3 also includes a game F7 having the game playing as the objective for behavior, a performance F8 having the performance as the objective for behavior, a soccer F9 having the soccer operation as the objective for behavior and a recording F10 having data saving as the objective for behavior. The behavioral model M3 determines an behavioral output transferring from the current stat to the targeted state based on the above-described status transition table.

The status transition table attaches priority to the respective states which are related with one another so that the behavior will be executed in the order of the priority sequence. In the present instance, the priority is increasing in the sequence of the recording F10, soccer F9, performance F8, game F7, autonomous behavior F6, feeling expression F5, reflection F4, obstruction evasion F3, posture management F2 and system management F1. Thus, the system management F1, posture management F2, obstruction evasion F3, reflection F4, feeling expression F5, autonomous behavior F6 in general, game F7, performance F8, soccer F9 and recording F10 are executed in this sequence of priority responsive to the sensor input from the CPC device 25.

Also, in making the behavioral output, this behavioral model M3 refers to the feeling value (feeling parameter) as an output signal of the feeling model and to an instinct value (instinct parameter) as an output signal of the instinct model, as shown in FIG. 5.

In the feeling model M1, the feeling parameter is increased and decreased responsive to the input evaluation value based on the sensor input from the CPC device 25, while being also increased and decreased responsive to the output evaluation value obtained on having the behavior. That is, the feeling parameter of the feeling model M1 is updated based on the input evaluation and on the output evaluation. Meanwhile, the feeling model M1 includes the feeling due to reaction to an input from an extraneous field or due to the innate status and that changed with lapse of time. Specifically, it includes grief, fear, surprise and hate, in addition to the aforementioned pleasure and anger.

In the instinct model M2, the feeling parameter is increased and decreased responsive to the input evaluation value based on the sensor input from the CPC device 25, while being also increased and decreased responsive to the output evaluation value obtained on having the behavior. That is, the feeling parameter of the instinct model M2 is updated based on the input evaluation and on the output evaluation. Meanwhile, the instinct model M2 is mainly derived from the innate state and is changed gradually. It is a model based mainly on the desire, such as appetite, desire for exercise, rest, love, knowledge and sex. For example, the instinct model such as appetite can be obtained by having reference to the residual battery capacity.

The ultimate behavioral output is done by the behavioral model M3 with reference being made to the feeling value showing the feeling parameter changed with the input evaluation value and the output evaluation value or to the instinct value showing the instinct parameter.

A behavior selection module 81 controls the CPC device 25 so that the operation will be consistent with the objective of the behavior by the behavioral output of the behavioral model M3 to cause movements of the limb, head and the tail to complete the targeted action. This action is the aforementioned output evaluation value and fed back to the feeling model M1 and to the instinct model M2.

Figure 7:
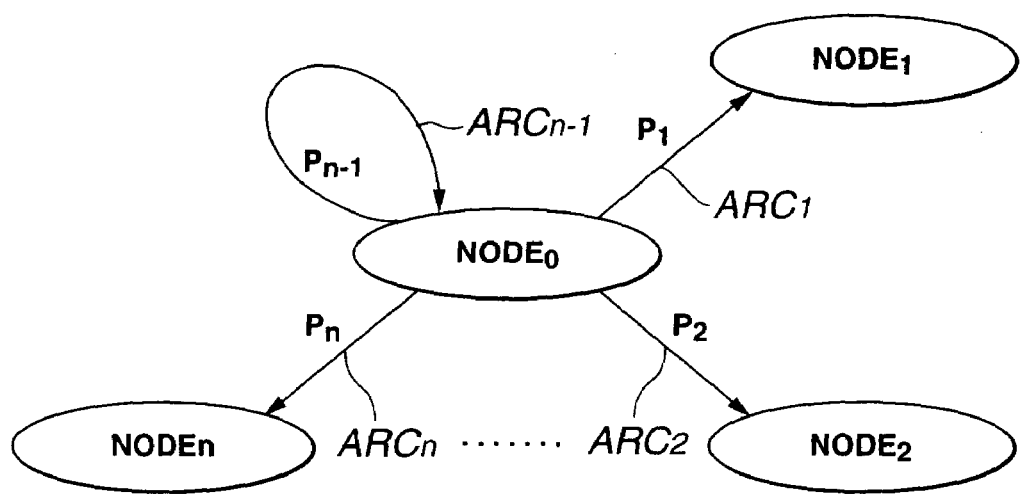
FIG. 7 illustrates the principle of a probability automaton prescribing the status transitions.

As for the status transition table, the principle of the algorithm, termed the probability automaton, determining the state of probabilistic transition based on the transition probability, is used. Referring to FIG. 7, the principle of the algorithm of the probability automaton is explained.

Referring to FIG. 7, if, in the algorithm termed the probability automaton, n states, where n is an integer, are represented by nodes NODE0 to NODEn, whether transition occurs from a node NODE0 to the other node NODE1~NODEn is probabilistically determined based on the transition probability P1~Pn set respectively for arcs ARC1~ARCn interconnecting the NODE0 to NODEn. The arc previously defines the states realized in the device (pet type robot 1) and indicates the operation of the device during transitions between the respective states in order to cause the transition of the operations of the device between the defined states.

By applying the algorithm of the probability automaton to the status transition table, the following node may be determined, if the current state is the first node NODE0, based on the current status and on the information for status transition such as sensor input of the CPC device 25.

Meanwhile, the behavioral model is not limited to taking a behavioral output based on the status transition table, but to taking other measures. For example, a behavioral model can be constructed using a neural network comprised by having reference to an information processing mechanism in a neural network. The neural network is constructed by an input layer 91, an intermediate layer 92 and an output layer 93.

Figure 8:
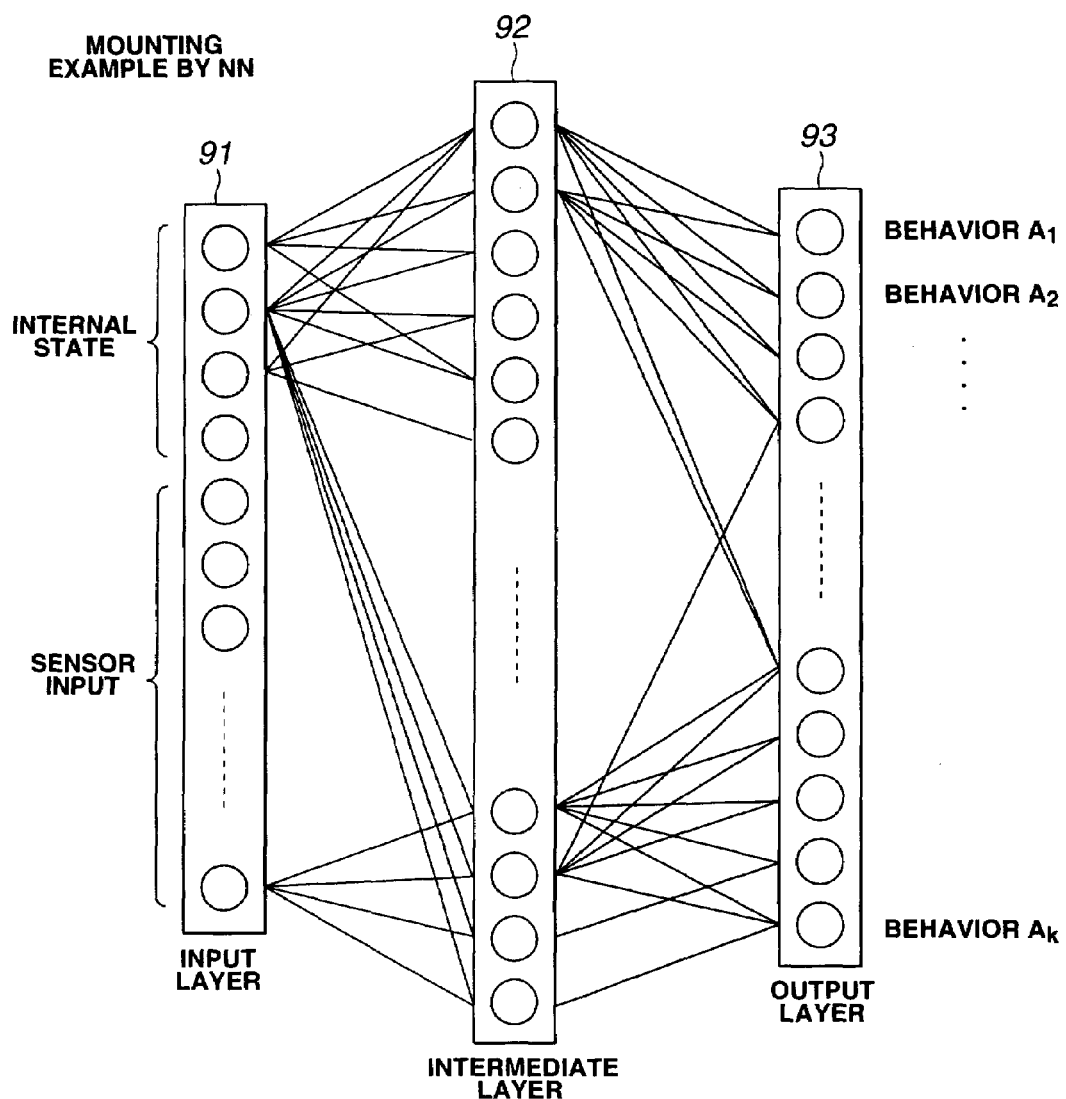
FIG. 8 illustrates a neural network applicable to the behavioral model.

For example, if such neural network is applied to the behavioral model of the pet type robot 1, the behaviors A1, A2, . . . , Ak, as output of the output layer 93, where k is an integer, are determined by the sensor input of the CPC device 25, as the information of the inner state or the information of the outer state, through the input layer 91 and the intermediate layer 92 as illustrated in FIG. 8. Also, in the neural network, weighted learning is executed so that, in the neural network, expected results of the behavior will be obtained from the expected input (information of the inner state and the sensor input).

In this manner, the pet type robot 1 is operated for expressing the feeling or takes a behavioral action by the feeling model and the behavioral model.

Meanwhile, the feeling model of the pet type robot 1 has been explained as determining the behavior responsive to the feeling parameter. However, as for the operation based on the feeling model of the pet type robot 1, status transition may be caused to occur by having reference to the status transition table in the behavioral model responsive to the feeling parameter and the prevailing status.

Figure 9:
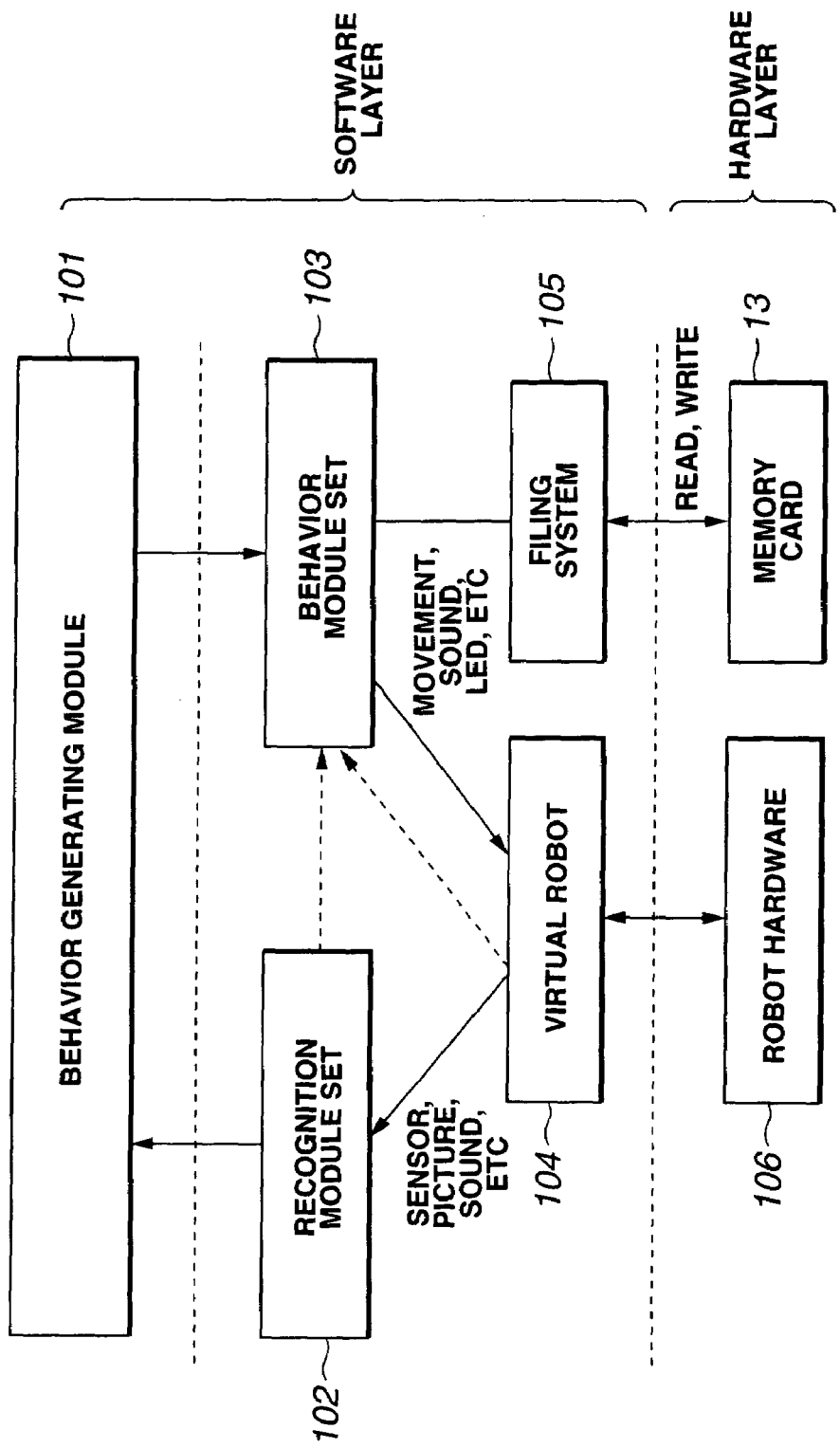
FIG. 9 illustrates a software layer and a hardware layer of the pet type robot.

Specifically, the pet type robot 1 is made up of a software layer and a hardware layer. FIG. 9 shows the software layer and the hardware layer making up the pet type robot 1. The software layer is constituted by a behavior generating module set 101, a recognition module set 102, a behavioral module set 103, a virtual robot 104 and a file system 105. The hardware layer is constructed by a robot hardware 106 constituting the main body portion of the pet type robot 1 and a memory card 13 as storage means that can be mounted/dismounted to or from the pet type robot 1.

The recognition module set 102 is fed with picture data, sound information or the contact information, as the sensor information of the CPC device 25. On recognition of the information to be informed from the sensor information, the recognition module set 102 outputs the information on the results of recognition to the behavior generating module set 101. That is, the recognition module set 102 recognizes with which information is associated the sensor information and outputs the results of recognition to the behavior generating module set 101.

The behavior generating module set 101 is a module set for generating the behavior of the pet type robot 1 and initiates the targeted behavior of the pet type robot 1 based on the results of recognition from the recognition module set 102. It is through this behavioral module set 103 that the behavior generating module set 101 controls the CPC device 25 to initiate targeted behavior, such as the action employing the limb, head or tail, sound outputting or data storage in memory means. The robot hardware 106 is constituted by e.g., this CPC device 25.

Moreover, control of the robot hardware 106 by the behavioral module set 103 is through the virtual robot 104. The virtual robot 104 is an imaginary robot which is the substitution of the real pet type robot 1 on the software. That is, the real pet type robot 1 is monitored on the software by the virtual robot 104. The operation of the real pet type robot is controlled based on the virtual robot 104. That is, the limb, head or the tail of the virtual robot 104 is operated or the sound radiated by an output of the behavioral module set 103 to perform corresponding control of the robot hardware 106 of the real pet type robot 1.

The file system 105 writes or read out data to or from the memory card 13. Specifically, the file system 105 writes or reads out the data to or from the memory card 13 by write or readout control by the behavioral module set 103.

The above is the constitution of the portions of the pet type robot 1 responsible for its feeling and behavior. By the behavioral model or the feeling model, constructed as explained above, the pet type robot 1 operates responsive to changes in the extraneous factor ascribable to extraneous state or to those in the innate factor ascribable to the innate state. The pet type robot 1 is constructed to store picture or sound data as pre-set data in memory means, such as the memory card 13 or the DRAM 16, responsive to the operation by the behavioral model or the feeling model or to other conditions.

The processing for storing data in the memory means in the pet type robot 1 is hereinafter explained. Specifically, the processing in case data is to be stored based on outputs of the behavioral model or the feeling model, in case data is to be stored based on the results of direct detection of the external state, in case data is to be stored based on the inputting of the pre-set information from outside and on the internal state as the internal state, is explained.

It is first assumed that data is to be stored in the memory means based on the output of the feeling model.

Figure 10:
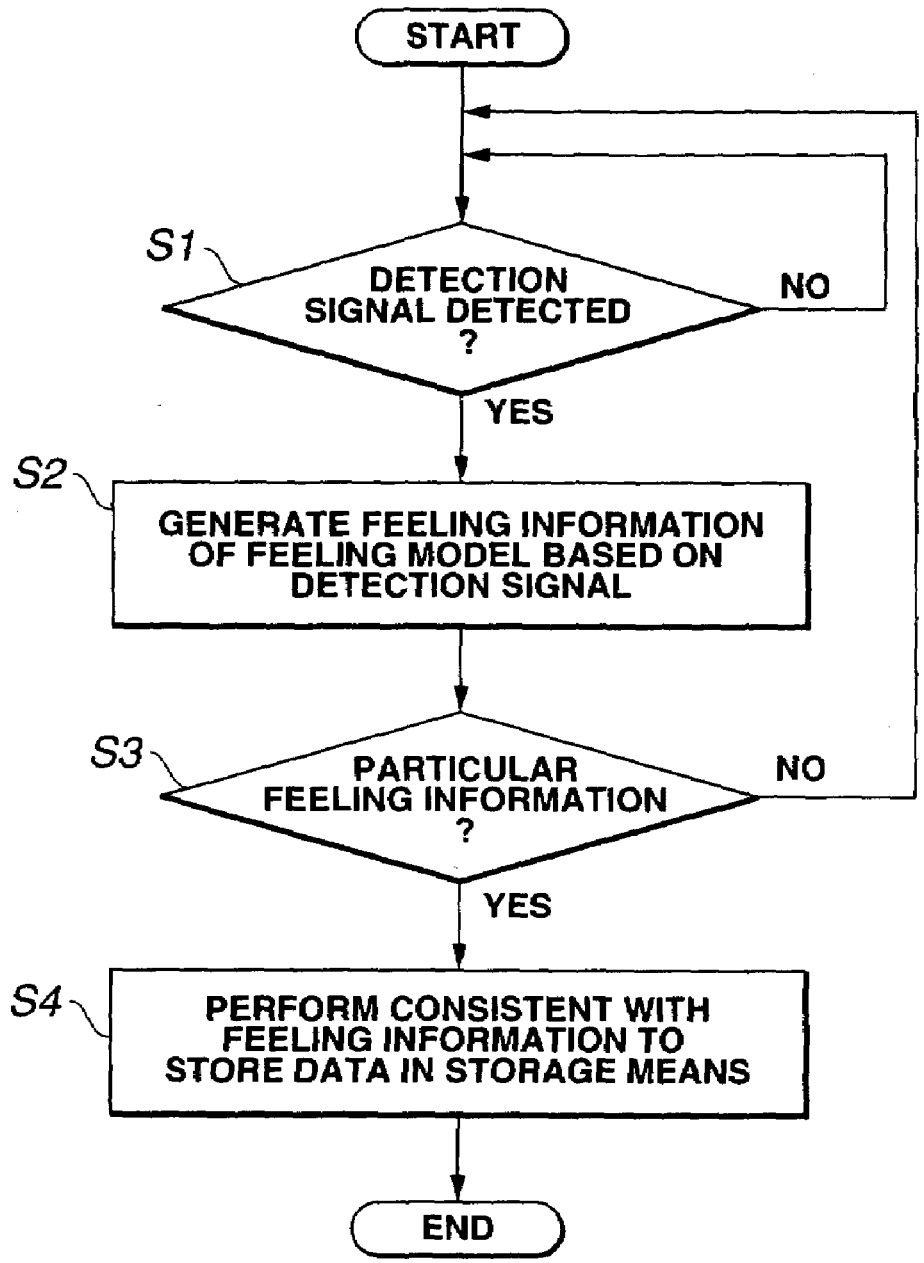
FIG. 10 is a flowchart for illustrating the processing of memorizing effective data on memory means based on feeling information changed with detection signals.

Referring to FIG. 10, the CPU 15 verifies whether or not a detection signal as a sensor output of the CPC device 25 has been detected. The CPU 15 at step S1 executes the decision processing as to whether or not a detection signal as a sensor input to the CPC device 25 has been detected. If, at step S1, the detection signal has been found to be detected, the CPU 15 advances to step S2.

At step S2, the feeling information (feeling parameter) of the pre-set feeling model corresponding to the detection signal is generated responsive to the value of the detection signal. The processing at this step S2 corresponds to the outputting of the feeling model explained in connection with FIG. 4.

At step S3, the CPU 15 checks whether or not the feeling parameter is a specified feeling parameter (feeling information). For example, it is determined whether or not the feeling parameter reaches a pre-set value. If the CPU 15 has found that the feeling parameter is not the specified feeling parameter, the CPU 15 again performs the processing from step S1. If the CPU 15 has found that the feeling parameter is the specified feeling parameter, the CPU 15 advances to step S4.

At step S4, the CPU 15 performs the operation corresponding to the feeling information and causes data to be stored in the memory means.

The pet type robot 1 is responsive to a detection signal indicating the external state, as explained above, to output the feeling information from the feeling model to cause data to be stored in the memory means. The specified processing downstream of the outputting of the feeling model responsive to the detection signal and to which are annexed conditions for verification is now explained by referring to the flowchart of FIG. 11.

First, at step S11, the CPU 15 checks whether or not an output value of the feeling model 64 (feeling parameter) has reached a pre-set threshold. Specifically, the CPU 15 checks whether or not the output value is larger than a pre-set threshold value. If it is decided at step S11 that the output value of the feeling model 64 has not exceeded the pre-set threshold value, the CPU 15 reverts to step S11. If, at step S11, the output value of the feeling model 64 is found not to exceed the pre-set threshold, the CPU 15 advances to step S12.

At step S12, the CPU 15 checks whether or not there is any vacant area in the memory card 13. If, at step S12, it is found that there is a vacant memory area, the CPU 15 advances to step S13 to cause the picture data captured from the CCD video camera 11 to be stored in the vacant area of the memory card 13. The CPU 15 then causes the time and date data and the feeling parameter, in association with the picture data, as the characteristic information of the picture data.

Figure 12:
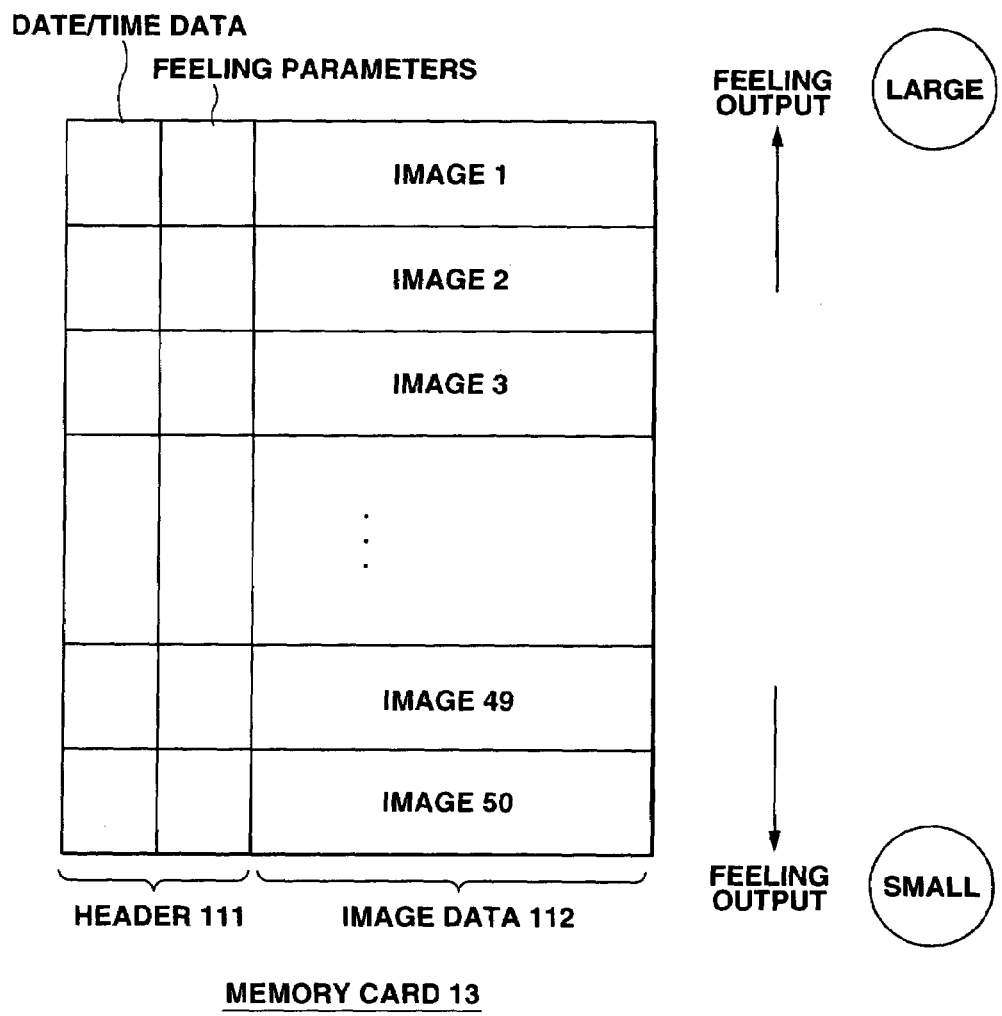
FIG. 12 illustrates a memorizing structure of a memory card used for memorizing a picture based on an output value of the feeling model.

At step S14, the CPU 15 re-arrays the picture data in the order of the decreasing magnitudes of the feeling model 64. The CPU 15 then reverts to step S11. That is, the memory area of the memory card 13 is made up of a header 111 memorizing the time and date data and the feeling parameter as the characteristic information and a picture data portion 112 memorizing the picture data, as shown in FIG. 12. The CPU 15 sorts the picture data in the order of the decreasing magnitude of the feeling output. There-arraying of the picture data at step S14 occurs by the re-arraying function of the CPU 15 of re-arraying the pre-set data written in the memory means in accordance with the information corresponding to the pre-set data.

If it is found at step S12 that there is no vacant memory area, the CPU 15 advances to step S15, where the CPU 15 checks whether or not the current output value of the feeling model 64 is larger than the smallest value of the feeling output accompanying the picture data memorized in the memory card 13. That is, the CPU 15 checks whether or not the current output value is larger than the value of the feeling output arrayed at the lowermost row in FIG. 12. If it is found at step S15 that the current output value is not larger or smaller than the smallest value of the memorized feeling output, the CPU 15 reverts to step S11.

If it is found at step S15 that the current output value is larger than the smallest value of the memorized feeling output, the CPU 15 advances to step S16 where the CPU 15 erases picture data corresponding to the smallest value of the feeling output. The picture data erasure is by the erasure control function of the CPU 15 in erasing pre-set data having the characteristic information appended thereto from the memory means.

The CPU 15 then advances to step S13 to cause storage of the then prevailing feeling output. This causes the feeling output to be stored sequentially in the order of the decreasing magnitude of the feeling output.

By the above processing, the pet type robot 1 is able to refer to the feeling information of the feeling model to cause the data to be stored in the memory means.

The pet type robot 1 may also be responsive to the feeling information of the feeling model to cause data to be stored in the memory means.

Figure 13:
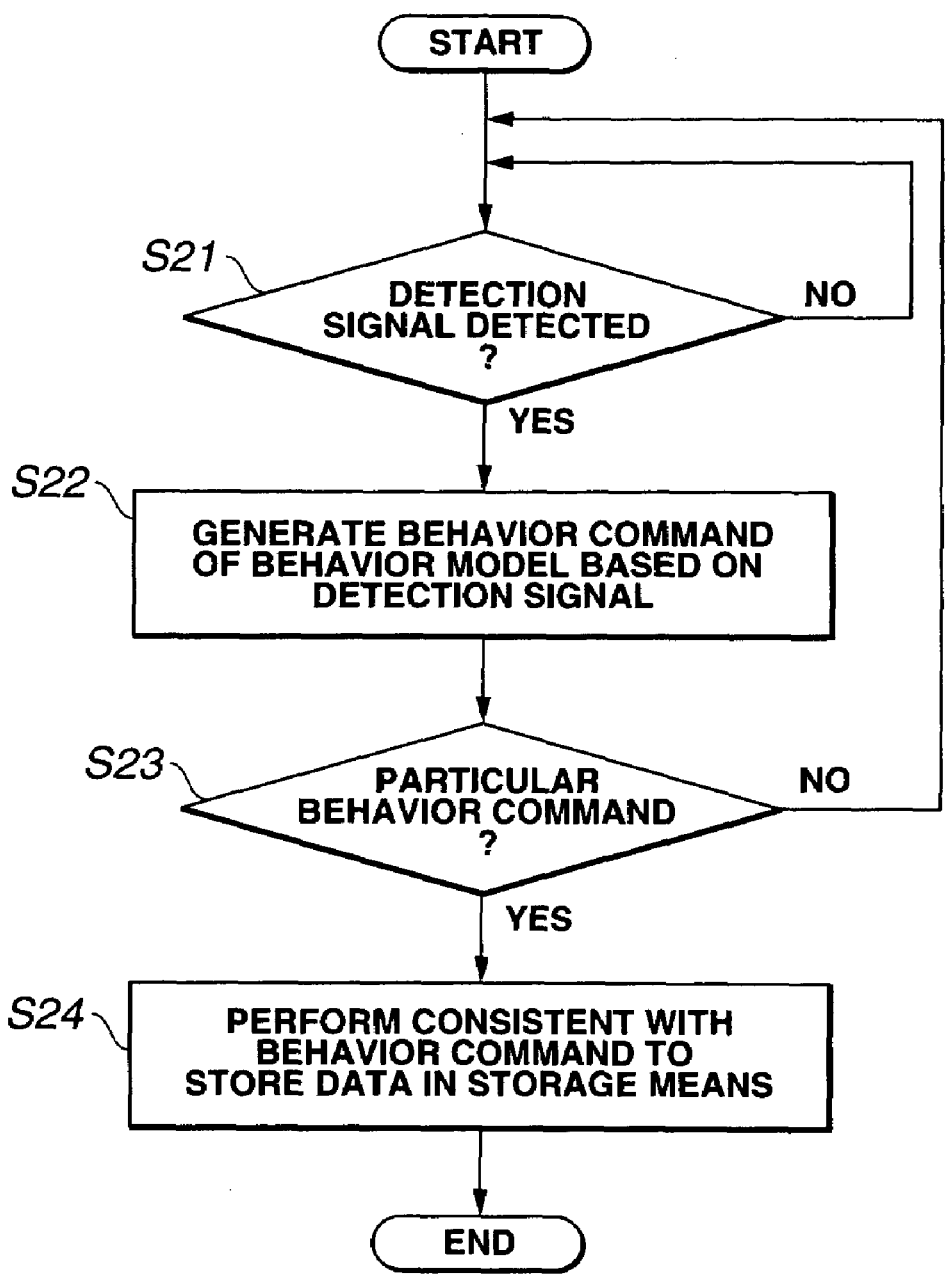
FIG. 13 is a flowchart for illustrating the processing of memorizing effective picture data in storage means based on a behavior command of a behavioral model changed with detection signals.

In this case, the CPU 15 at step S21 checks whether or not the detection signal corresponding to the sensor input of the CPC device 25 is being detected, as shown in FIG. 13. The CPU 15 performs the decision processing at step S21 until detection of the detection signal. If it is found at step S21 that the detection signal has been detected, the CPU 15 advances to step S22.

At step S22, the behavior command of the behavioral model is generated in association with the detection signal. The processing at this step S22 corresponds to the behavior output consistent with the status transition table explained in connection with FIG. 5.

At step S23, the CPU 15 checks whether or not the behavior command is a particular behavior command. If it is found that the behavior command is not a particular behavior command, the processing again is performed as from step S21. If it is found that the behavior command is a particular behavior command, the CPU 15 advances to step S24.

At step S24, the CPU 15 performs the operation consistent with the feeling information and causes the data to be stored in the storage means.

The pet type robot 1 is responsive to a detection signal specifying the external state, as explained above, to output a pre-set behavior command from the behavioral model, to perform the operation consistent with the behavior command to cause data to be stored in the memory means.

The pet type robot 1 may also be responsive to the instinct information of the instinct model to cause data to be stored in memory means.

Figure 14:
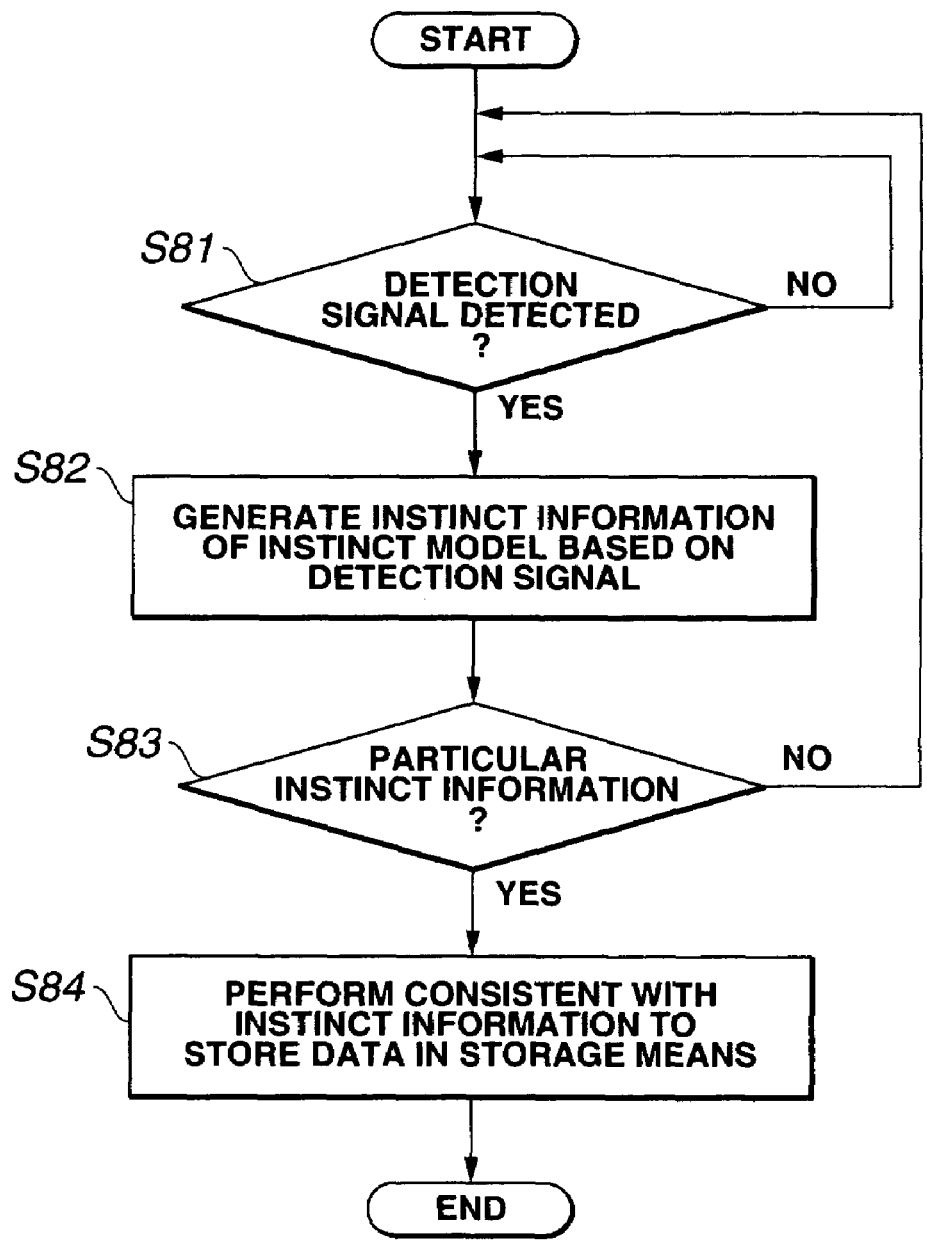
FIG. 14 is a flowchart for illustrating the processing of memorizing effective picture data in storage means based on a behavior command of a behavioral model changed with detection signals.

In this case, the CPU 15 at step S81 checks whether a not a detection signal corresponding to the sensor input of the CPC device 25 is being detected as illustrated in FIG. 14. The CPU 15 performs the decision processing at step S81 until detection of the detection signal. If it is found at step S81 that the detection signal has been detect, the CPU 15 advances to step S82.

At this step S82, the CPU 15 generates the instinct information of the instinct model responsive to the detection signal. The processing at this step S82 is to correspond to the behavior output consistent with the status transition table explained in connection with FIG. 5. That is, the behavior output is determined by having reference to the instinct information, with the pet type robot 1 taking a behavioral action consistent with the instinct in through the intermediary of the behavior output.

At the next step S83, the CPU 15 verifies whether or not the instinct information is a particular instinct information. If the CPU 15 finds that the instinct information is not the specified instinct information, it performs the processing from step S81 again. If the CPU 15 finds that the instinct information is the specified instinct information, it advances to step S84.

At this step S84, the CPI 15 performs the operation consistent with the feeling information, whilst causing the data to be stored in the memory means. That is, data erasure or re-arraying can be performed, as explained with reference to the flowchart of FIG. 11 with respect to the above-described feeling model.

The pet type robot 1 outputs the information from the behavioral model and the instinct model, responsive to the detection signal indicating the extraneous state, and performs the operation consistent with the information to cause data to be stored in the memory means.

By having the output of e.g., the behavioral model as the data acquisition condition, the pet type robot 1 is able to cause data to be stored in the memory means.

Figure 15:
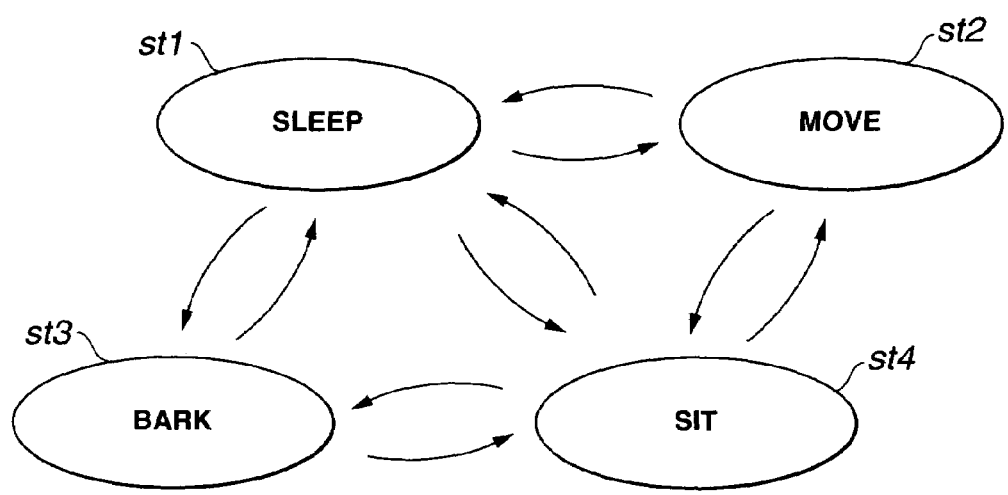
FIG. 15 illustrates the pet type robot causing status transitions and memorizing a picture in storage means in the status transitions of the pet type robot.

The pet type robot 1 is able to write data in the memory means responsive to the operation of status transition by the status transition table. For example, in case the status (node) is able to transfer between the sleeping state st1, a walking state st2, a sitting state st3 and a barking state st4, as shown in FIG. 15, the pet type robot 1 can transfer from a given state to another state, responsive to a behavior command, while causing data to be stored in the memory means. For example, data may be stored when the status transfers from the walking state st2 to the sleeping state st1. This allows picture data to be written in the memory card 13 as data directly previous to sleeping. By inputting a picture photographed by the CCD video camera 11, with the time the value of the anger feeling output as a transition condition of the status transition table, and by outputting the behavior of inputting the speech by a microphone 21, the operation of data writing operation to the memory means can be allocated to within the anger feeling operation. Thus, the pet type robot 1, who has its head struck violently and felt angry, can record a picture of a person who struck and his abusive speech on the recording means.

Also, if, with the obstruction detection by the sensor and with the pet type robot 1 feeling fear as the transition condition, the picture is captured at this time, a picture of the pet type robot 1 feeling fear as to the step or height difference directly before it. Since the picture is stored with the line of sight of the pet type robot 1 as a reference, a user who has reproduced the picture is able to see the picture as if the picture is a steep cliff, as the line of sight of the pet type robot 1.

By providing a number of status transitions of data stored in the storage means based on the outputs of the behavioral model or the feeling model, a variety of data can be captured in the storage means.

Figure 11:
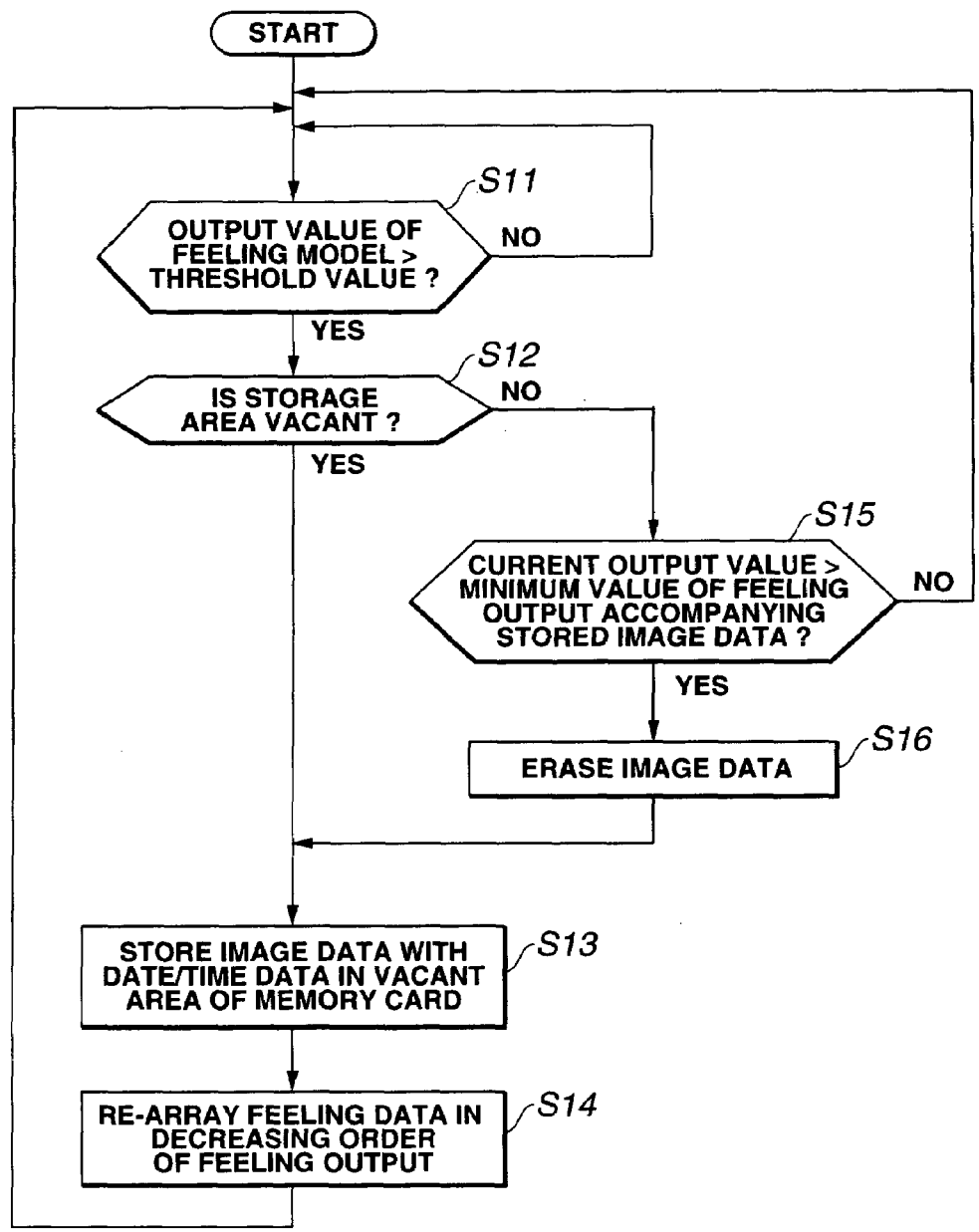
FIG. 11 is a flowchart for illustrating the processing for memorizing effective picture data on a memory card based on an output value of the feeling model.

In the embodiment explained using FIG. 11, reference is had to the feeling parameter of the characteristics information as a condition of erasing data at steps S15 and S16. However, the present invention is not limited to this configuration. For example, it is possible to have reference to the date and time data of the characteristics information to determine the data erasure based on the decision as to whether or not the pre-set time has elapsed. In this case, data which has elapsed pre-set time can be erased based on the date and time data.

Figure 16:
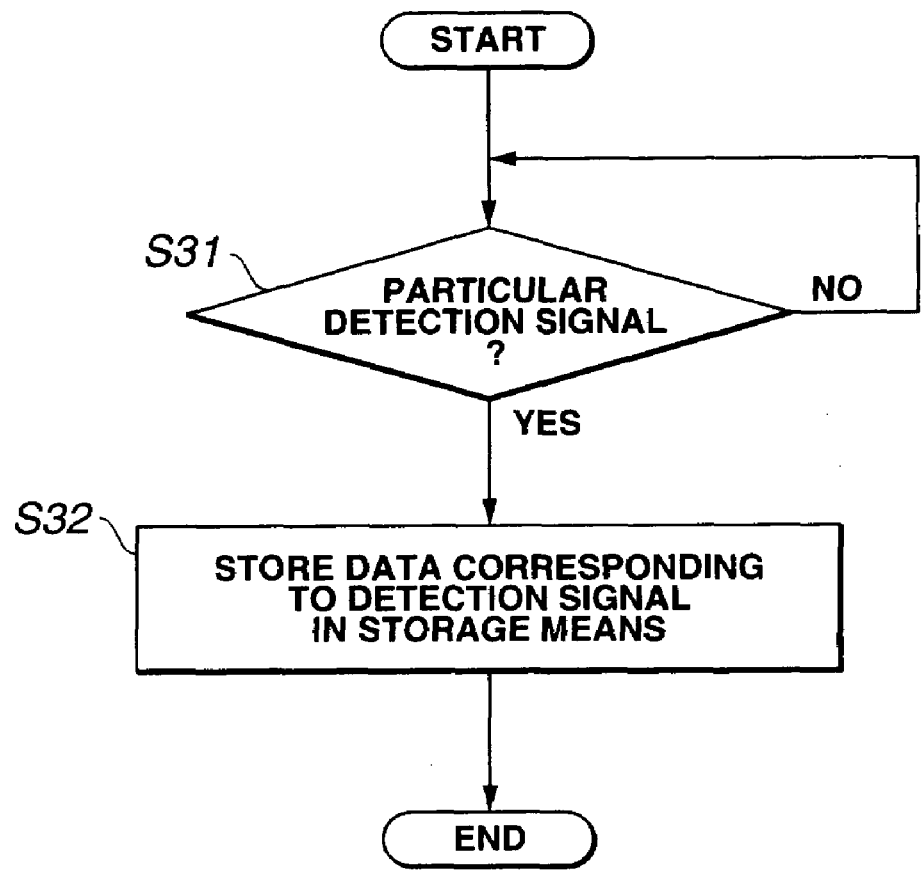
FIG. 16 is a flowchart for illustrating the processing of detecting a specified detection signal and memorizing effective data in association with the detection signal in the storage means.

The case in which data is stored in the storage means based on the sensor input (detection signal) of the CPC device 25 is explained. That is, although a behavioral model or a feeling model changed with a detection signal is checked to store data in the storage means, the pet type robot 1 is also able to directly check the extraneous state to store data in the storage means. This is now explained with reference to the flowchart of FIG. 16.

First, the CPU 15 at step S31 verifies whether or not the detection signal is a particular detection signal. For example, it is checked whether or not the value of the detection signal has reached a pre-set value. The CPU 15 performs decision processing at step S31 until detection of the particular detection signal. If it is found at step S31 that the detection signal has been detected, the CPU 15 advances to step S32 where the CPU stores data corresponding to the detection signal in the storage means.

The pet type robot 1 directly verifies the detection signal as explained above, to store data in the storage means responsive to the verified results. Further details are explained with reference to the flowchart of FIG. 17.

First, at step S41, the CPU 15 verifies whether or not the value of the detection signal as detected responsive to the extraneous state by a sensor of the CPC device 25 is larger than a pre-set threshold value. If, for example, a sound is entered to the microphone 21, it ie checked whether or not the value of the corresponding detection signal is larger than the pre-set threshold value.

If, at step S41, the value of the detection is verified not to exceed the pre-set threshold value, the CPU 15 reverts to step S41. If it is found at step S41 that the value of the detection signal exceeds the pre-set threshold value, the CPU 15 advances to step S42. The case in which the value of the detection signal is found to exceed the pre-set threshold value, for example, in which the sound has been detected by the microphone 21, means that the sound is a loud sound.

At step S42, the CPU 15 verifies whether or not there is any vacant area in the storage area of the memory card 13. If it has been found at step S42 that there is vacant space in the storage area, the CPU 15 advances to step S43 to store the picture data captured from the CCD video camera 11 in the vacant area in the memory card 13. At this time, the CPU 15 causes the date and time data and the feeling parameter to be stored as characteristics information in association with the picture data.

Figure 18:
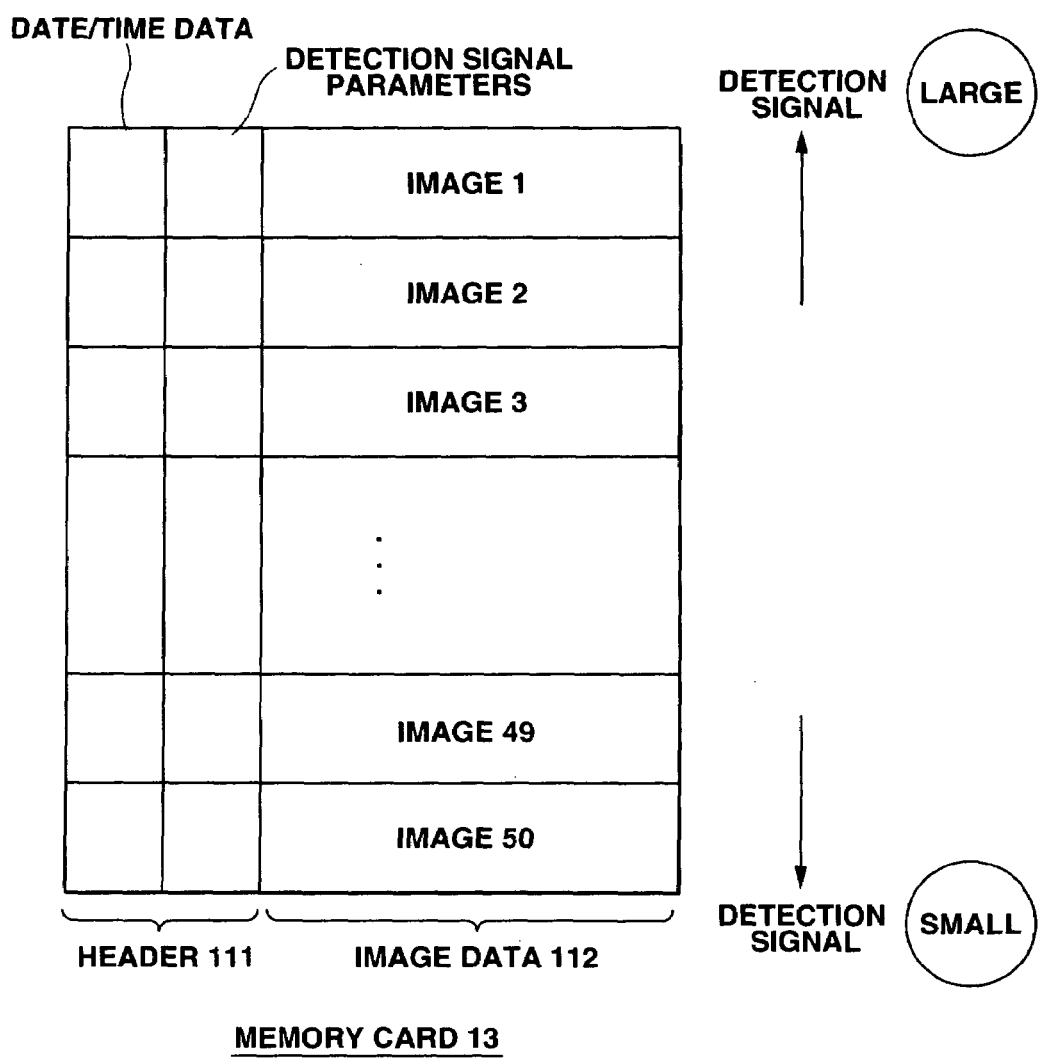
FIG. 18 illustrates the storage structure of a memory card in which a picture is stored based the value of the detection signal.

At step S44, the CPU 15 re-arrays picture data in the order of the increasing values of the detection signals. The CPU 15 then reverts to step S41. That is, the storage area of the memory card 13 includes a header 111 storing parameters of the date and time data and detection signals and a picture data portion 112 storing the picture data, as shown in FIG. 18. The CPU 15 sorts the picture data in the order of the decreasing magnitude of the feeling output.

If, at step S42, it has been found that there is no vacant storage area, the CPU 15 advances to step S45 to check whether or not the current value of the detection signal exceeds the minimum value of the detection signal ancillary to the picture data stored in the memory card 13. That is, the CPU 15 checks whether or not the current detection signal is larger than the value of the detection signal arranged in a lowermost position in FIG. 18. If the current value of the detection signal is verified at step S45 to be not larger than or smaller than the smallest value of the stored detection signal, the CPU 15 reverts to step S41.

If, at step S45, the current detection signal is verified to be larger than the smallest value of the stored detection signal, the CPU 15 advances to step S46 to erase the picture data corresponding to the smallest value of the detection signal. The CPU 15 then advances to step S43 to store the value of the detection signal. This causes the detection signals to be stored sequentially in the order of the decreasing values of the detection signals in the memory card 13.

By the above processing, the pet type robot 1 is able to store the data in the memory means by directly referring to the values of the detection signals.

For example, if reference is had to the detection signal by the sensor of the CPC device 25 as data storage conditions, the pet type robot 1 is able to store the picture or the speech at such time in memory means, such as memory card 13.

Thus, if a cup has dropped and broken in the vicinity of the pet type robot 1, the resulting catastrophic state can be stored as picture and speech in the storage means responsive to the magnitude of the sound. The picture can be acquired as real by causing the pet type robot 1 to swing its neck in a direction towards the origin of the sound. The direction in which the sound has been entered may be identified by the phase difference of the sound entering the sensor.

Specifically, the behavior of the pet type robot 1 turning to the direction of the sound source is outputted, with the large sound being inputted to the sensor as a condition for transition in the status transition table. Assuming that the pet type robot has swung its head with the transition condition in the destination of transition as an object, the behavior of storing the picture data at such time in the memory card 13 is allocated. In this manner, if a cup has been dropped in the vicinity of the pet type robot 1, the pet type robot 1 can turn its head to the sound source responsive thereto to write the catastrophic state as a picture in the memory card 13.

Figure 17:
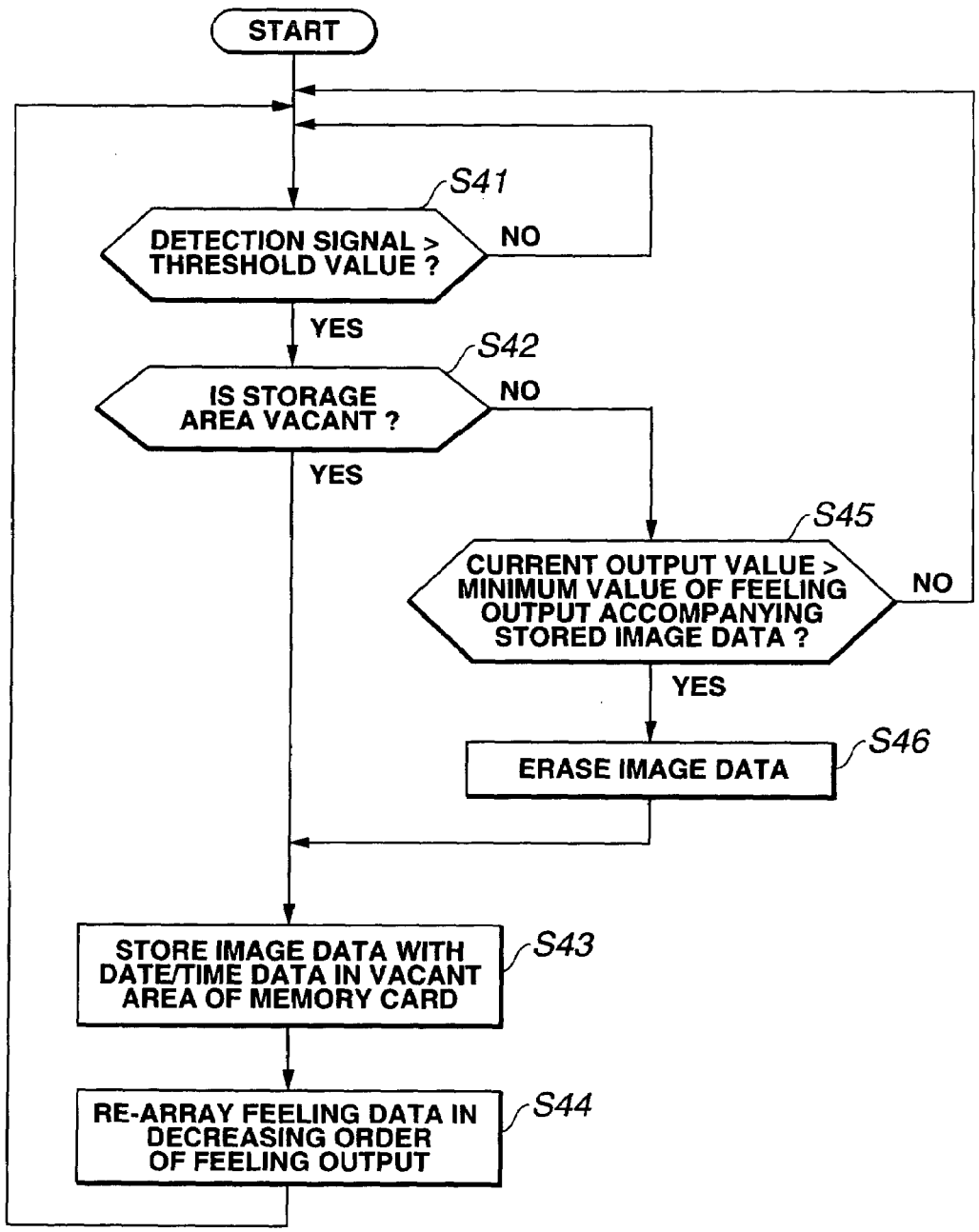
FIG. 17 is a flowchart for illustrating the processing of memorizing effective data in the storage means based on the value of the detection signal.

In the embodiment shown in FIG. 17, the feeling parameter of the characteristics information is referred to as a condition or erasing the data at steps S45 and S46. This, however, is merely illustrative because reference may be had to the date and time data of the characteristics information to determine the data erasure based on the decision as to whether or not the pre-set time has elapsed.

Figure 19:
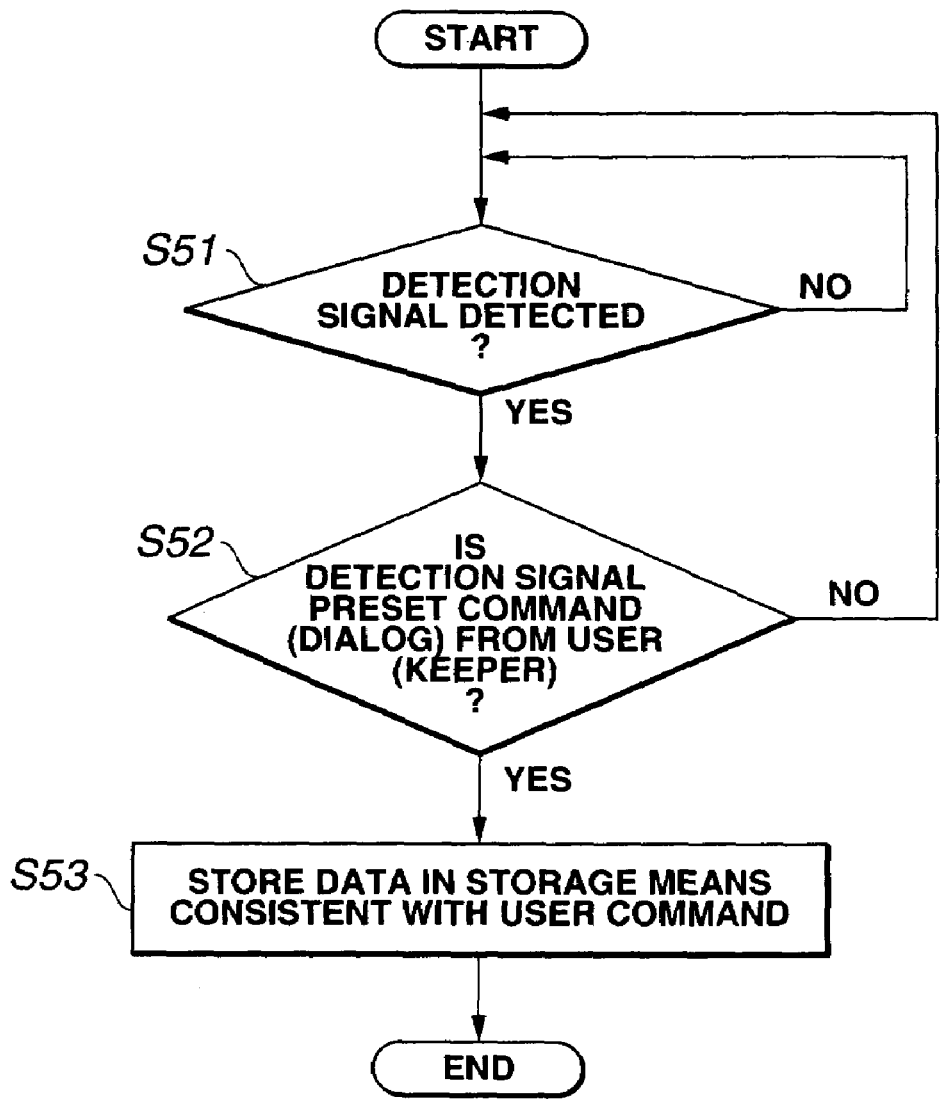
FIG. 19 is a flowchart for illustrating the processing of memorizing effective data in the storage means based on an information input from outside.

Next, a case in which data is to be stored in memory means responsive to the inputting of the pre-set information from outside is explained. In the foregoing description, the pet type robot 1 voluntarily records the information. A case in which data is recorded on the recording means by interaction (dialog) with the user (keeper) is explained. In this case, the pet type robot 1 evaluates a detection signal entered from the sensor of the CPC device 25 to write data in the storage means responsive to the input detection signal (command) based on the results of evaluation. Reference is had to the flowchart of FIG. 19.

First, the CPU 15 at step S51 verifies whether or not a detection signal has been detected. The check operation at step S51 is performed until detection of the detection signal. If it has been found at step S51 that the detection signal has been detected, the CPU 15 advances to step S52.

At step S52, the CPU 15 verifies whether or not the detection signal is a pre-set command (dialog) from the keeper. The decision here is made by, for example, the aforementioned input evaluation portion. If the detection signal is verified not to be a pre-set signal from the keeper, the CPU 15 again performs the processing at step S51. If the detection signal is verified to be a pre-set signal from the keeper, the CPU 15 advances to step S53.

At step S53, the CPU 15 causes data to be stored in the storage means in keeping with the user's command.

By this dialog with the user, the pet type robot 1 is able to store data in the memory means.

By this processing, data can be stored in the memory means in keeping with the status transition, with the transition condition then being the sitting pet type robot 1 having its head struck lightly twice. Specifically, data is stored by the following processing in the memory means:

As an extraneous state, a touch sensor 20 as pressure measurement means is struck and a detection signal (pressure information) outputted from the touch sensor 20 on being struck is evaluated by the above-described input evaluation portion. If the result of evaluation that being struck twice is a pre-set command from the user is obtained, the pet type robot 1 stores the picture data or the speech data in the storage means.

Meanwhile, data acquisition by the pet type robot 1 through dialog is not limited to being struck, as explained above. For example, the pet type robot 1 is able to identify a command by a pre-set language to record data.

In this manner, data can be intentionally stored in the pet type robot 1 by the keeper touching the pet type robot 1 as a pre-set operation or speaking to the pet type robot 1 in a pre-set language.

It is also possible to use a device for interaction for the pet type robot 1, such as a sound commander, to command the pet type robot 1 to cause data to be stored in the storage means. In this case, the pet type robot 1 can be provided with a module recognizing the sound to induce status transition in keeping with the corresponding command by handling the result of recognition of the recognition module as a sensor input of the behavioral model to cause the data to be stored in the storage means.

A case in which reference is had to the inner state of the pet type robot 1 for storage in the storage means is explained. In the above embodiment, the pet type robot 1 writes data in the storage means based on the behavioral parameter or the feeling parameter, writes data in the storage means based on the detection signal as the result of detection of the extraneous state or writes data in the storage means based on the detection signal as the result of detection of the extraneous state. That is, in the above-described embodiment, the pet type robot 1 writes data in the memory means by extraneous factors. The pet type robot 1 is able not only to write data in the storage means based on the extraneous factors, but also to write data based on the inner factors.

Figure 20:
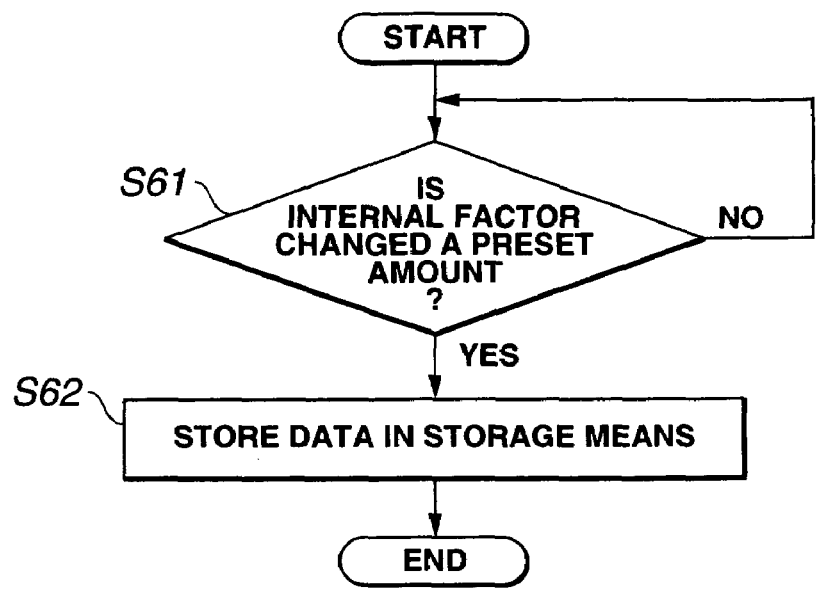
FIG. 20 is a flowchart for illustrating the processing of memorizing effective data in the storage means based on the innate information.

The pet type robot 1 is able to increase its appetite by chronological changes ir behavior, that is to consume the battery capacity. Thus, data can be stored in the storage means based on the decrease in the battery capacity, with the battery capacity decrease being then the changes in the inner state as the inner factor. This will now be explained with reference to the flowchart of FIG. 20.

At step S61, the CPU 61 verifies whether or not the pre-set inner factor (inner state) has been changed a specified amount. The CPU 15 performs the discriminating processing of step S61 until detection of the detection signal of a pre-set amount of the inner factor. If it has been found at step S61 that the inner factor has changed a specified amount, the CPU 15 advances to step S62 where the CPU 15 causes data to be stored in the storage means.

The pet type robot 1 causes data to be stored in the memory means based on these changes in the inner factor. Since the pet type robot 1 is also able to store data in the memory means when the decrease in the battery capacity has reached a pre-set value, the pet type robot 1 can cause the picture data to be stored in the storage means as data when it is hungry.

In this processing, the CPU 15 has a function of monitoring the amount of changes in the inner factor and causes data to be written in the storage means based on the monitoring result by the monitor control function.

The processing in case data stored in the storage means by the pet type robot 1 is read out by the personal computer 31 is hereinafter explained. Specifically, the operation of processing for reading out picture data stored in the memory card 13 is explained with reference to the flowchart shown in FIG. 21.

Figure 21:
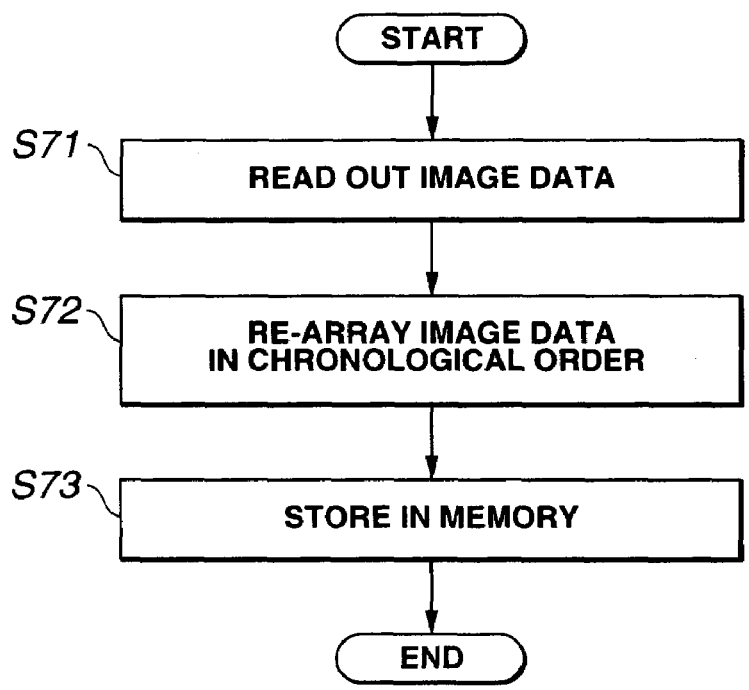
FIG. 21 is a flowchart for illustrating the operation of reading out image data stored in a memory card.
Figure 22:
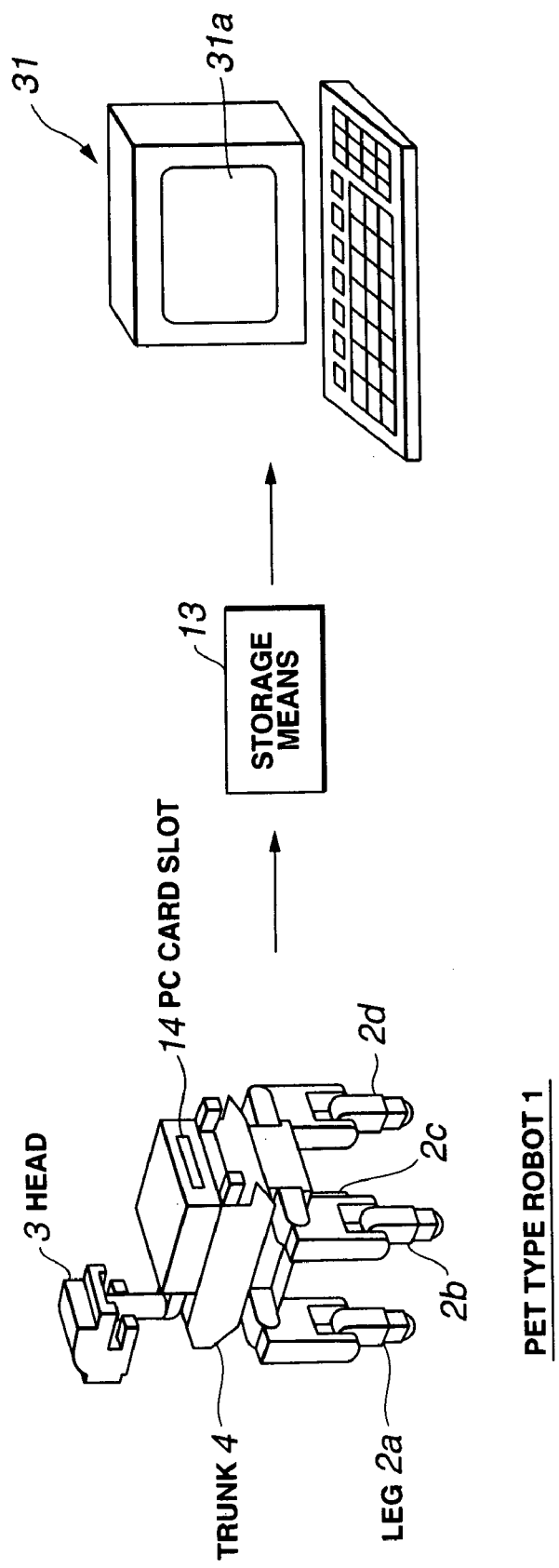
FIG. 22 illustrates the step of taking out data stored in a memory card in the pet type robot from the memory card in a personal computer.

First, the user extracts the memory card 13 from the PC card slot 14 to load the memory card 13 in a card slot, not shown, in the personal computer 31, as shown in FIG. 22. When the memory card 13 is loaded in the card slot, the CPU, not shown, enclosed in the personal computer 31 reads out at step S71 picture data stored in the memory card 13, as shown in FIG. 21. If the picture data is stored in the memory card 13 in association with the feeling output, the CPU reads out picture data in the order of the decreasing magnitudes of the feeling output. On the other hand, if the picture data is stored in the memory card 13 in association with the magnitude of the detection signal, the CPU reads out picture data in the order of the decreasing magnitudes of the feeling output.

At step Second input evaluation unit 72, the CPU re-arrays the read-out picture data in the chronological order of the date and time data to proceed to step S73. At step S73, the CPU stores the re-arrayed picture data in a memory, not shown, to terminate the processing.

This allows the user to read out picture data at any time on the personal computer 31. Therefore, the user can read out picture data to enjoy the picture data as an album recording the life of the pet type robot 1.

For example, the personal computer 31 is able to read out picture data stored in the memory card 13 by a so-called browser which is a browser software stored on the furnishing medium to demonstrate the read-out picture data on a display such as a monitor. For example, the picture data stored in the memory card 13 can be browsed by the browser s follows:

The user can, for example, view the video data written by the pet type robot 1 on the memory card 13 by executing the browser on the personal computer 31. Moreover, the browser is able to refer to the date and time data to array and display the pictures chronologically.

Figure 23:
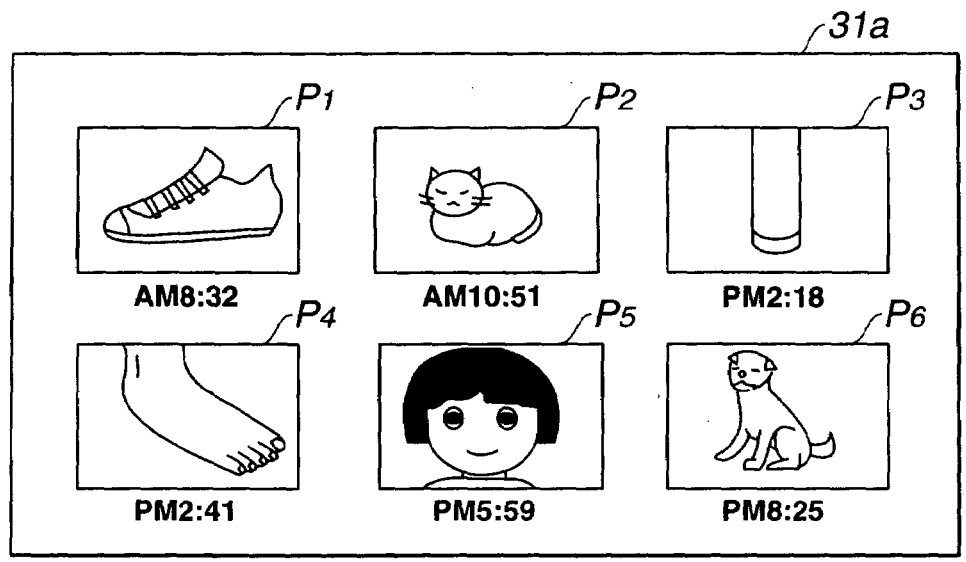
FIG. 23 is a front view showing a monitor displaying a picture stored in the memory card on a personal computer by a browser which is a browsing software

Specifically, the user can view first to sixth pictures P1 to P6 stored by the pet type robot 1 on the memory card 13 chronologically on the personal computer 31, as shown in FIG. 23. For example, the first picture P1 is a shoe placed on the porch, the second picture P2 is a kept cat, the third picture P3 is a table leg, the fourth picture P4 is a leg of someone, the fifth picture P5 is a keeper's face and the sixth picture P6 is a kept dog. These first to sixth pictures P1 to P6 may be those when the output magnitude of the feeling model is large or when the magnitude of the detection signal is large.

If time is displayed as reference, diurnal events may be browsed. If every other day is taken as a reference, data can be stored for prolonged time to permit the pictures to be browsed. By re-arraying the events chronologically based on the time information accompanying the information, the user is able to view the events as a sort of an album recording the growth or life records of the pet type robot 1.

Figure 24:
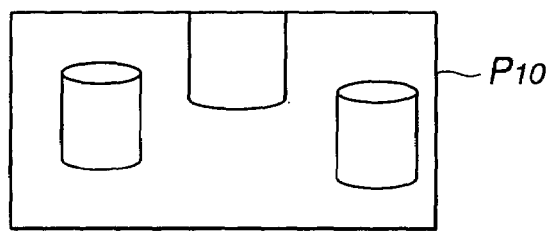
FIG. 24 illustrates a picture captured on the memory card when the pet type robot feels fear as an obstacle lying directly before it, with the corresponding output value of the feeling model exceeding a threshold value.

Moreover, the browser is able to display the pictures recorded by the pet type robot 1 on the memory card 13 like a picture diary. For example, the pet type robot 1 memorizes a picture when an output value of the feeling model or the value of the detection signal has exceeded a certain threshold value. For example, if the pet type robot 1 feels fear as to an obstacle lying before it, and if the output value of the feeling model at that time exceeds a threshold value, it writes the picture at that time on the memory card 13, so that the pet type robot 1 writes a picture P10 when it has felt fear as to the obstacle, as shown for example in FIG. 24.

Figure 25:
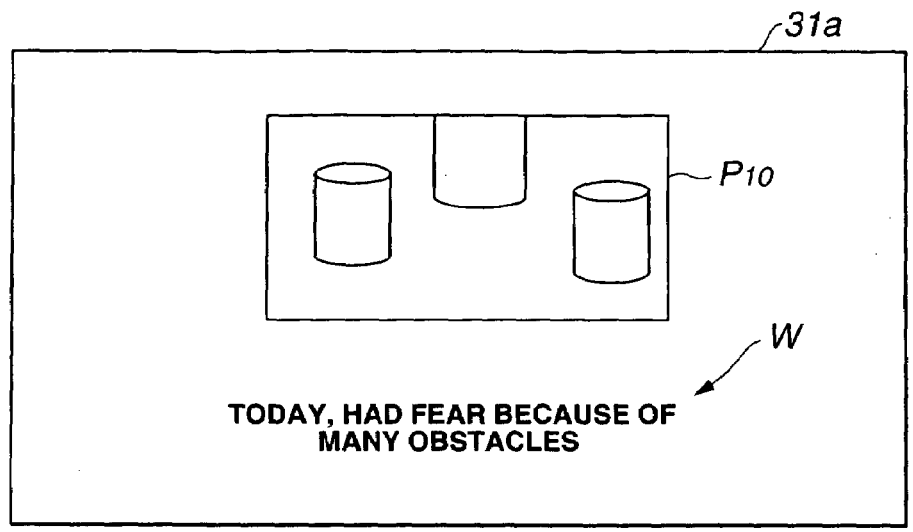
FIG. 25 illustrates the function of the browser for illustrating that the picture stored on the memory card can be displayed as a picture album.
Figure 26:
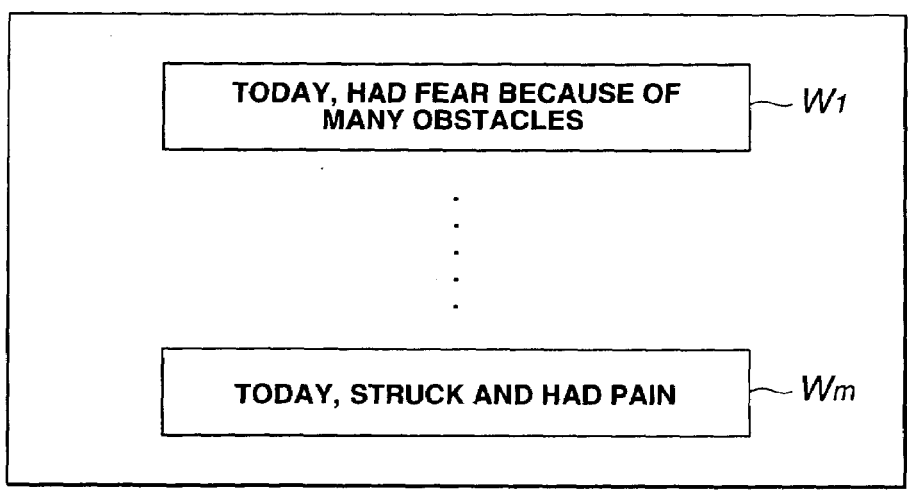
FIG. 26 illustrates that the sentence displayed in combination with the picture on the picture album is formulated into a database.
Figure 27:
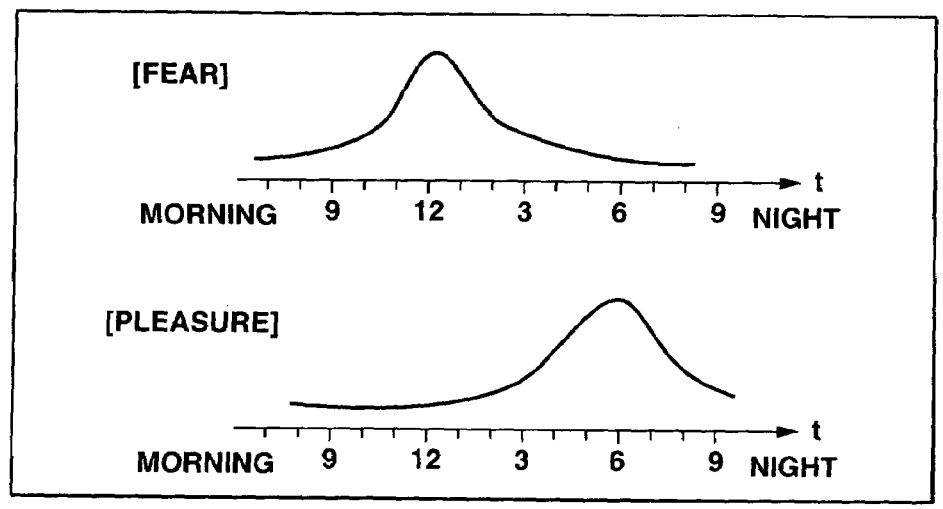
FIG. 27 illustrates the function of the browser function for illustrating that diurnal changes of the feeling output of the feeling model of the pet type robot can be demonstrated.

Based on the decision condition accompanying the picture P10 written in this manner on the memory card 13, and on the output value of the feeling model, the browser outputs an associated sentence W, reading: "Today, I has fear because there were many obstacles", as an example, to a monitor 31*a* along with the picture P10 for display like a picture diary. The sentence W associated with the picture P is selected from the database made up of plural sentences W1 to Wm, where m is an integer. An audio output may also be issued in meeting with the outputting of the output picture as illustrated in FIGS. 25 and 26. The browser also is able to graphically display only changes in the output value of the feeling model. For example, the browser is able to display changes n the output value of the "fear" or "pleasure" of the diurnal feeling model with respect to time plotted on the abscissa in a graph of FIG. 27. This permits the user to see the pleasure, anger, grief or pleasure for a day of the pet type robot 1.

In the above-described embodiment, data is mainly stored on the memory card 13. This, however, is not limitative since data can be memorized in a DRAM 16.

In inputting a picture to the personal computer 31, data can be sent from the pet type robot 1 to the personal computer 31 using radio communication means, such as PC card RangeLAN or cable communication means such as USB. By using the radio or wired communication means, it is possible to view picture data etc captured by the pet type robot 1 in real-time on the personal computer 31.

It is also possible to install the computer program recorded on the recording medium (furnishing medium) to cause the pet type robot 1 to execute the aforementioned processing.

The furnishing medium for supplying a computer program executing the above processing to the user may be enumerated by a transmission medium on a network, such as Internet or digital satellite, in addition to the information; recording medium, such as a magnetic disc or a CD-ROM.

According to the present invention, it is possible to cause a robot apparatus to collect the information autonomously. This permits the user to check the information collected by the robot apparatus with an feeling of expectation while remaining unawares of what information will be acquired. Since the information is collected under a certain condition, efficient information collection is rendered possible, while it is unnecessary to increase the recording capacity of recording means which memorizes the information.

According to the present invention, it is also possible to visualize the information as viewed by the robot apparatus to increase the friendly feeling entertained for the robot apparatus.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. A robot apparatus having a dynamic behavioral model or a dynamic feeling model that is changed at least based on extraneous factors and a behavioral output, comprising:

detection means for detecting extraneous states;

storage means for storing data;

write control means for writing pre-set data in said storage means based on a detection signal detected by said detection means;

erasure control means for erasing pre-set data stored in said storage means, wherein said write control means adds characteristics information of said detection signal to said pre-set data to write the resulting signal in said storage means, and wherein said erasure control means erases said pre-set data added to said characteristics information from said storage means when a pre-set condition consistent with the characteristics information holds; and a plurality of legs for walking, wherein said detection means includes pressure measurement means for measuring the pressure as the extraneous state, and wherein said evaluating means evaluates the pressure information as the detection signal from said pressure measurement means.

2. The robot apparatus according to claim 1 wherein said detection means includes extraneous data inputting means, wherein extraneous data is inputted in said extraneous data inputting means, and wherein said write control means writes extraneous input data to said extraneous data inputting means in said storage means.

3. A robot apparatus having a dynamic behavioral model or a dynamic feeling model that is changed at least based on extraneous factors and a behavioral output, comprising:

detection means for detecting extraneous states;
storage means for storing data;
write control means for writing pre-set data in said storage means based on a detection signal detected by said detection means;
erasure control means for erasing pre-set data stored in said storage means, wherein said write control means adds characteristics information of said detection signal to said pre-set data to write the resulting signal in said storage means, and wherein said erasure control means erases said pre-set data added to said characteristics information from said storage means when a pre-set condition consistent with the characteristics information holds; and
a plurality of legs for walking, wherein said pre-set condition for said erasure control means is whether or not a pre-set value has been reached.

4. A robot apparatus having a dynamic behavioral model or a dynamic feeling model that is changed at least based on extraneous factors and a behavioral output, comprising:
detection means for detecting extraneous states;
storage means for storing data;
write control means for writing pre-set data in said storage means based on a detection signal detected by said detection means;
erasure control means for erasing pre-set data stored in said storage means, wherein said write control means adds characteristics information of said detection signal to said pre-set data to write the resulting signal in said storage means, and wherein said erasure control means erases said pre-set data added to said characteristics information from said storage means when a pre-set condition consistent with the characteristics information holds; and
a plurality of legs for walking, wherein said pre-set condition for said erasure control means is whether or not a pre-set time has elapsed.

5. A robot apparatus having a behavioral model for generating a behavioral output, said robot apparatus comprising:
detection means for detecting extraneous states, wherein the input evaluation is based on the detected extraneous states;
storage means for storing data;
write control means for writing data in said storage means based on a detection signal detected by said detection means;
erasure control means for erasing data stored in said storage means, wherein said write control means adds characteristics information of said detection signal to said data to write the resulting signal in said storage means, and wherein said erasure control means erases said data added to said characteristics information from said storage means when a pre-set condition consistent with the characteristics information holds; and
a plurality of legs for walking,
wherein the behavioral output is based on a feeling model that changes with respect to an input evaluation and an output evaluation based on previous behavior output.

6. A robot apparatus having a dynamic behavioral model or a dynamic feeling model that is changed at least based on extraneous factors and a behavioral output, comprising:
detection means for detecting extraneous states;
storage means for storing data;
write control means for writing pre-set data in said storage means based on a detection signal detected by said detection means;
erasure control means for erasing pre-set data stored in said storage means, wherein said write control means adds characteristics information of said detection signal to said pre-set data to write the resulting signal in said storage means, and wherein said erasure control means erases said pre-set data added to said characteristics information from said storage means when a pre-set condition consistent with the characteristics information holds; and
a plurality of legs for walking, wherein said detection means includes pressure measurement means for measuring the pressure as the extraneous state, and wherein said evaluating means evaluates the pressure information as the detection signal from said pressure measurement means.

7. The robot apparatus according to claim 1 wherein said detection means includes extraneous data inputting means, wherein extraneous data is inputted in said extraneous data inputting means, and wherein said write control means writes extraneous input data to said extraneous data inputting means in said storage means.

8. A robot apparatus having a dynamic behavioral model or a dynamic feeling model that is changed at least based on extraneous factors and a behavioral output, comprising:
detection means for detecting extraneous states;
storage means for storing data;
write control means for writing pre-set data in said storage means based on a detection signal detected by said detection means;
erasure control means for erasing pre-set data stored in said storage means, wherein said write control means adds characteristics information of said detection signal to said pre-set data to write the resulting signal in said storage means, and wherein said erasure control means erases said pre-set data added to said characteristics information from said storage means when a pre-set condition consistent with the characteristics information holds; and
a plurality of legs for walking, wherein said pre-set condition for said erasure control means is whether or not a pre-set value has been reached.

9. A robot apparatus having a dynamic behavioral model or a dynamic feeling model that is changed at least based on extraneous factors and a behavioral output, comprising:
detection means for detecting extraneous states;
storage means for storing data;
write control means for writing pre-set data in said storage means based on a detection signal detected by said detection means;
erasure control means for erasing pre-set data stored in said storage means, wherein said write control means adds characteristics information of said detection signal to said pre-set data to write the resulting signal in said storage means, and wherein said erasure control means erases said pre-set data added to said characteristics information from said storage means when a pre-set condition consistent with the characteristics information holds; and
a plurality of legs for walking, wherein said pre-set condition for said erasure control means is whether or not a pre-set time has elapsed.

* * * * *